(12) United States Patent
Wu et al.

(10) Patent No.: US 12,399,422 B2
(45) Date of Patent: Aug. 26, 2025

(54) PROJECTION OPTICAL SYSTEM WITH A CONCAVE REFLECTOR IN THE PROJECTION LENS

(71) Applicant: SUN YANG OPTICS DEVELOPMENT CO., LTD., Taoyuan (TW)

(72) Inventors: Sheng-Che Wu, Taoyuan (TW); Yu-Hung Chou, Taoyuan (TW); Wei-Hao Huang, Taoyuan (TW)

(73) Assignee: SUN YANG OPTICS DEVELOPMENT CO., LTD., Taoyuan (TW)

( * ) Notice: Subject to any disclaimer, the term of this patent is extended or adjusted under 35 U.S.C. 154(b) by 477 days.

(21) Appl. No.: 17/985,269

(22) Filed: Nov. 11, 2022

(65) Prior Publication Data
US 2023/0084002 A1    Mar. 16, 2023

Related U.S. Application Data

(63) Continuation-in-part of application No. 17/106,747, filed on Nov. 30, 2020, now abandoned.

(51) Int. Cl.
  *G03B 21/28*     (2006.01)
  *G02B 17/08*     (2006.01)
(52) U.S. Cl.
  CPC ......... *G03B 21/28* (2013.01); *G02B 17/0896* (2013.01)

(58) Field of Classification Search
  CPC .... G03B 21/28; G02B 17/0896; G02B 13/16; G02B 13/18
  See application file for complete search history.

(56) References Cited

U.S. PATENT DOCUMENTS

| | | | | |
|---|---|---|---|---|
| 8,054,556 | B2 * | 11/2011 | Chen | G02B 17/0852 359/728 |
| 9,523,842 | B2 * | 12/2016 | Takano | G03B 21/56 |
| 9,625,691 | B2 * | 4/2017 | Hsu | G02B 17/08 |
| 9,625,692 | B2 * | 4/2017 | Takahashi | G02B 17/0852 |
| 9,864,177 | B2 * | 1/2018 | Takano | G02B 15/1421 |
| 10,107,996 | B2 * | 10/2018 | Lin | G02B 13/22 |
| 10,154,164 | B2 * | 12/2018 | Kano | H04N 23/56 |
| 10,444,478 | B2 * | 10/2019 | Gong | G02B 17/08 |
| 10,884,221 | B2 * | 1/2021 | Gong | G02B 17/0852 |
| 10,890,840 | B2 * | 1/2021 | Takano | G03B 21/142 |
| 11,003,061 | B2 * | 5/2021 | Nishikawa | G02B 17/0852 |

(Continued)

*Primary Examiner* — Bao-Luan Q Le
(74) *Attorney, Agent, or Firm* — Birch, Stewart, Kolasch & Birch, LLP

(57) ABSTRACT

A projection optical system with a concave reflector in the projection lens, comprising: an image source; a lens group; a reflector; an image and an aperture, the lens group and the reflector form multiple optical paths between the image and image source, each optical path has a chief ray and a marginal ray, the chief ray of one of the optical paths forms a chief ray of a paraxial image height at the part where image source be near to the optical axis, the chief ray of another one of the optical paths forms a marginal ray of an off-axis image height at the part where image source be far from the optical axis; wherein 2.2<F1/F2<3.0; 8<IMH/TR/Fno<19; 5<IMH*T1/T2<8. whereby the optimal optical performance of resolving power and optical path interference allowance will be achieved.

7 Claims, 19 Drawing Sheets

(56) References Cited

U.S. PATENT DOCUMENTS

| | | | |
|---|---|---|---|
| 2006/0193036 A1* | 8/2006 | Suzuki | G02B 17/0856 359/364 |
| 2008/0068563 A1* | 3/2008 | Abe | G03B 21/147 348/E9.027 |
| 2008/0068564 A1* | 3/2008 | Abe | G03B 21/147 348/E9.027 |
| 2008/0158439 A1* | 7/2008 | Nishikawa | G02B 17/08 359/651 |
| 2008/0192336 A1* | 8/2008 | Ohzawa | G02B 17/08 359/364 |
| 2009/0257117 A1* | 10/2009 | Baba | G02B 13/16 359/364 |
| 2010/0053737 A1* | 3/2010 | Fujita | G02B 17/0852 359/364 |
| 2010/0097582 A1* | 4/2010 | Nagase | G03B 21/28 353/98 |
| 2010/0118281 A1* | 5/2010 | Yamada | G03B 21/005 353/70 |
| 2010/0128234 A1* | 5/2010 | Nishikawa | G02B 17/0896 353/101 |
| 2010/0157421 A1* | 6/2010 | Abe | G02B 17/0896 359/364 |
| 2010/0245784 A1* | 9/2010 | Nishikawa | G02B 17/08 359/730 |
| 2011/0026111 A1* | 2/2011 | Nagatoshi | G03B 21/28 359/364 |
| 2012/0019791 A1* | 1/2012 | Abe | G03B 21/28 353/99 |
| 2012/0120484 A1* | 5/2012 | Konuma | G02B 15/145 359/364 |
| 2012/0236266 A1* | 9/2012 | Takahashi | H04N 9/3185 353/69 |
| 2012/0249979 A1* | 10/2012 | Morikuni | G03B 21/28 353/70 |
| 2012/0327508 A1* | 12/2012 | Benoit | G02B 17/08 359/364 |
| 2013/0235356 A1* | 9/2013 | Takahashi | G03B 21/28 353/99 |
| 2014/0204351 A1* | 7/2014 | Matsuo | G02B 13/16 353/98 |
| 2014/0268073 A1* | 9/2014 | Takano | G03B 21/28 353/98 |
| 2014/0340658 A1* | 11/2014 | Takano | G03B 21/28 359/708 |
| 2015/0029474 A1* | 1/2015 | Tatsuno | G02B 17/08 353/97 |
| 2015/0138518 A1* | 5/2015 | Tatsuno | G03B 21/208 353/98 |
| 2015/0293434 A1* | 10/2015 | Matsuo | G02B 17/08 353/101 |
| 2016/0216497 A1* | 7/2016 | Minefuji | G02B 17/0852 |
| 2016/0223888 A1* | 8/2016 | Nishikawa | G02B 13/16 |
| 2016/0238822 A1* | 8/2016 | Minefuji | G02B 9/64 |
| 2016/0238825 A1* | 8/2016 | Minefuji | G02B 15/1421 |
| 2016/0299415 A1* | 10/2016 | Minefuji | G03B 21/006 |
| 2016/0363746 A1* | 12/2016 | Minefuji | G03B 21/142 |
| 2017/0131530 A1* | 5/2017 | Liu | G02B 17/08 |
| 2017/0332057 A1* | 11/2017 | Matsuo | G03B 21/147 |
| 2018/0173088 A1* | 6/2018 | Minefuji | G02B 13/16 |
| 2019/0285972 A1* | 9/2019 | Minefuji | G03B 21/142 |
| 2021/0173292 A1* | 6/2021 | Yanagisawa | G03B 21/006 |
| 2021/0181487 A1* | 6/2021 | Yasui | G03B 21/28 |
| 2021/0232036 A1* | 7/2021 | Morikuni | G02B 13/16 |

* cited by examiner

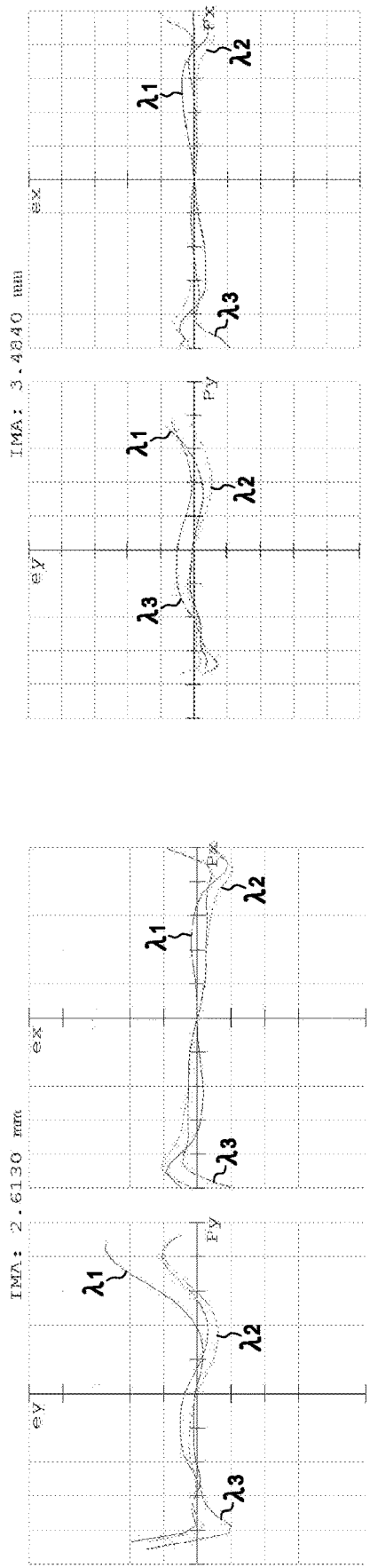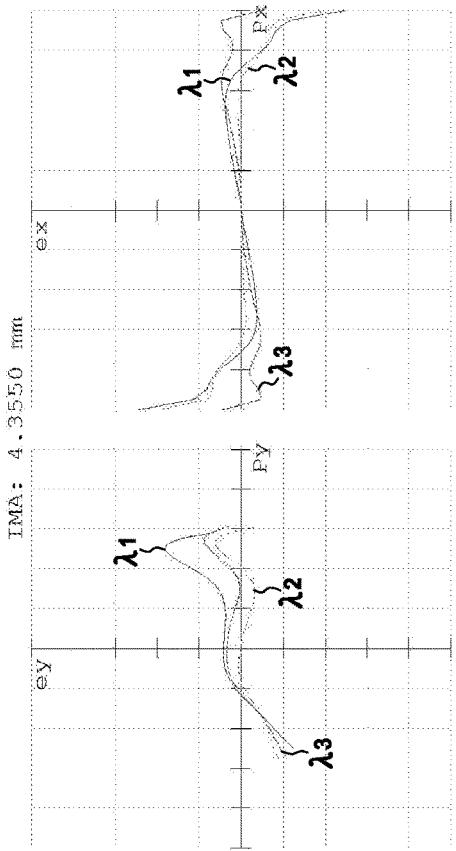
FIG.1J  FIG.1K  FIG.1L

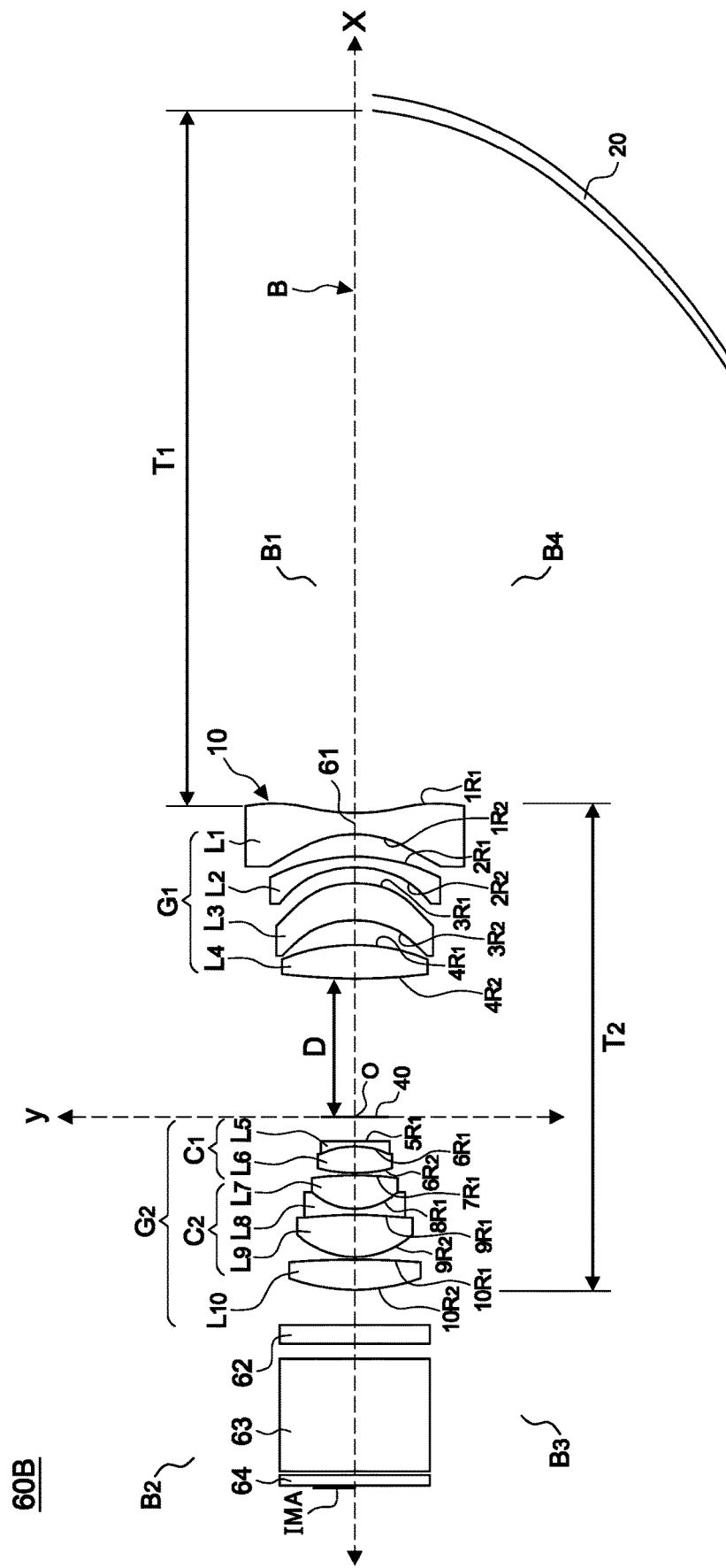

PROJECTION OPTICAL SYSTEM WITH A CONCAVE REFLECTOR IN THE PROJECTION LENS

This patent application is a continuation-in-part of Ser. No. 17/106,747 filed on Nov. 30, 2020.

BACKGROUND OF THE INVENTION

1. Field of the Invention

The present invention relates to a projection optical system with a concave reflector in the projection lens, particularly to one that has an image source, a lens group, an aperture, a reflector, an image, a first quadrant, a second quadrant, a third quadrant and a fourth quadrant of rectangular coordinates.

2. Description of the Related Art

Projectors have been innovated with latest technology for the past years, ranging from projectors with normal focal lengths to ones with short focal lengths. They can be applied in many aspects like multimedia presentations, television projection, family cinemas, teleconferences, etc. In recent years, projectors with short focal lengths are mainly applied in educational fields and are favorable in small families.

In view of the quality of the projected images, the longer the focal lengths are, the narrower the angle of the field of view the projectors have, and as the focal lengths become shorter, the distortion of the images gets worse. So it is impossible to guarantee the quality of the images with the focal lengths reduced. Therefore, it is desirable to make an arrangement of the structures of the projectors to achieve greater efficiency in projections while ensuring the quality of the projected images.

U.S. Pat. No. 8,054,556 disclosed a lens adapted to image a first image plane at a reduced side onto a magnified side is provided. The lens has an optical axis. The lens includes a lens group and a concave reflective mirror. The lens group is disposed in the light path between the reduced side and the magnified side. The concave reflective mirror is disposed in the light path between the lens group and the magnified side. The offset of the first image plane with respect to the optical axis is greater than 100%. The throw ratio of the lens is less than 0.3.

US Pub. No. 2019/0285972A1 disclosed a first optical group that forms an intermediate image and a second optical group that enlarges and projects the intermediate image formed by the first optical group satisfy a variety of conditions. Therefore, the overall length of the entire lens system of the projection system is reduced in a linear arrangement, or the distance between the first optical group and the second optical group is increased and an optical path deflector that deflects the optical path is disposed at the middle of the optical path between the first and second optical groups to fold the optical path.

SUMMARY OF THE INVENTION

A primary objective of the present invention is to provide a projection optical system with a concave reflector in the projection lens which has an image source, a lens group, an aperture, a reflector, an image, a first quadrant, a second quadrant, a third quadrant and a fourth quadrant of rectangular coordinates that make the image source lead the optical path effectively and meanwhile provide images with better quality.

Another objective of the present invention is to provide a projection optical system that has a front group lens and a rear group lens operated correspondingly to enhance quality of the images and reduce the manufacture cost.

Yet another objective of the present invention is to provide a projection optical system that make the width of the image and the project distance of the image operated correspondingly to enhance quality of the images and make the project ratio smaller.

To achieve the objects mentioned above, the present invention comprises an image source; a lens group arranged at the lateral side of the image source; a reflector positioned at said lateral side of the lens group; an image, the lens group and the reflector form multiple optical paths between the image and image source, each optical path has a chief ray and a marginal ray; and an aperture arranged inside the lens group and the center of the aperture is defined as an origin, define the axial direction as X axis and the radial direction as Y axis to form a rectangular coordinate system, the rectangular coordinate system has a first quadrant, a second quadrant, a third quadrant, a fourth quadrant, the image source and the image located in the same quadrant, and the projection optical system has an optical axis which coincided with the X axis making the chief ray of one of the optical paths forms a chief ray of a paraxial image height at the part where image source be near to the optical axis, the chief ray of another one of the optical paths forms a marginal ray of an off-axis image height at the part where image source be far from the optical axis; wherein said projection optical system complies below features: a) $2.2<F1/F2<3.0$, wherein F1 is the focal length of the reflector, and F2 is the focal length of the lens group; b) $8<IMH/TR/Fno<19$, wherein IMH is the maximum image height, TR is the throw ratio, and Fno is the F-number (the ratio of the number of focal lengths to the number of apertures); c) $5<IMH*T1/T2<8$, wherein IMH is the maximum image height, T1 is the distance from the reflector to the lens group, and T2 is the total length of the lens group;

Whereby when the image source and the image are located in the second quadrant and the reflector is located in the fourth quadrant, the chief ray of the paraxial image height intersects with the chief ray of the off-axis image height intersect, then sequentially forming a first point and a second point, the first point located at the origin and the second point is located in the first quadrant, and the chef ray of the optical path intersects with the marginal ray of the optical path, and sequentially forming a third point and a fourth point, the third point located at the fourth quadrant and the fourth point is located in the second quadrant.

Furthermore, the lens group can be divided into a front group lens and a rear group lens, the front group lens is close to the reflector side, and the rear group lens is close to the image source side.

Also, the front group lens includes at least two aspheric lens, and at least one of the aspheric lens is a negative lens.

Also, the rear group lens includes at least two doublet and an aspheric lens, the Nd of the last lens is 1.8-2.05 and the Abbe number of the last lens of the rear group lens is 17-24 and is close to the image source side.

Also, the width of the image is set as W and the project distance from the reflector to the image is set as T, and conforms to the conditional formula of the projection ratio of the projection optical system: $0.16<T/W<0.3$.

Also, the F value of the projection optical system is 1.6-3.2.

Also, the displacement of the center point of the image source corresponding to the optical axis is define as d, and short side of the image source is defined as h, and fits the condition: 130%<2d/h>160%.

With the feature disclosed above, the present invention uses the image source, the lens group, the aperture, the reflector, the image, operated correspondingly with the first quadrant, the second quadrant, the third quadrant and the fourth quadrant of rectangular coordinates, and the front group lens and the rear group lens operated correspondingly, and the width of the image and the project distance of the image operated correspondingly to make the image source lead the optical path effectively, reduce the manufacture cost, make the project ratio smaller, and make the F value of the projection optical system smaller to be able to install with large aperture so as to enhance quality of the images.

Also, the focal length, maximum image height, throw ratio, F-number (Fno) and other numerical values of the present invention are designed to complement each other and achieve the best optical performance. Compared with the lens patent of the prior art, the projection optical system of the present invention not only has differences, but also can take into account the image quality when the projection distance is shortened, so that the projection configuration can be adjusted to the optimum, so as to obtain a good optical effect; Wherein, when 2.2<F1/F2<3.0, wherein F1 is the focal length of the reflector, and F2 is the focal length of the lens group, it will achieve optimizing optical performance for various aberrations and dimensions; when 8<IMH/TR/Fno<19, it will achieve optimizing the optimal optical performance of resolution, tolerance sensitivity and cost performance can be achieved; when 5<IMH*T1/T2<8, the optimal optical performance of resolving power and optical path interference allowance will be achieved.

BRIEF DESCRIPTION OF THE DRAWINGS

FIG. 1J is a ray fan plot showing an image height of 2.6130 mm of the image source of the first embodiment of the present invention;

FIG. 1K is a ray fan plot showing an image height of 3.4840 mm of the image source of the first embodiment of the present invention;

FIG. 1L is a ray fan plot showing an image height of 4.3550 mm of the image source of the first embodiment of the present invention;

FIG. 1O is a graph illustrating the lateral color aberration of the first embodiment;

FIG. 2A is a schematic diagram illustrating lenses arrangement of the second embodiment the present invention;

DETAILED DESCRIPTION OF THE PREFERRED EMBODIMENT

Figure 1A:
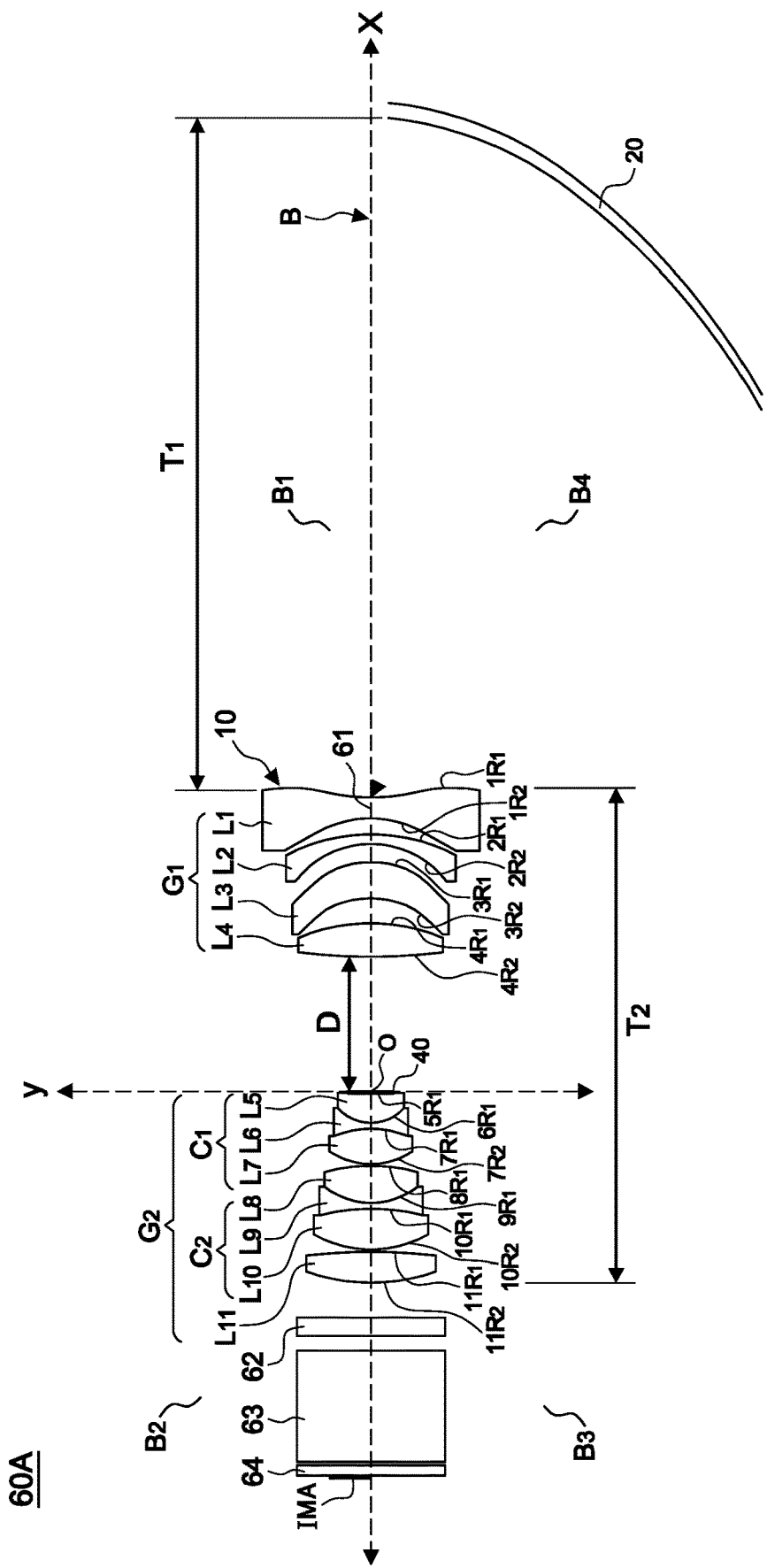
FIG. 1A is a schematic diagram illustrating lenses arrangement of the first embodiment the present invention.
Figure 1B:
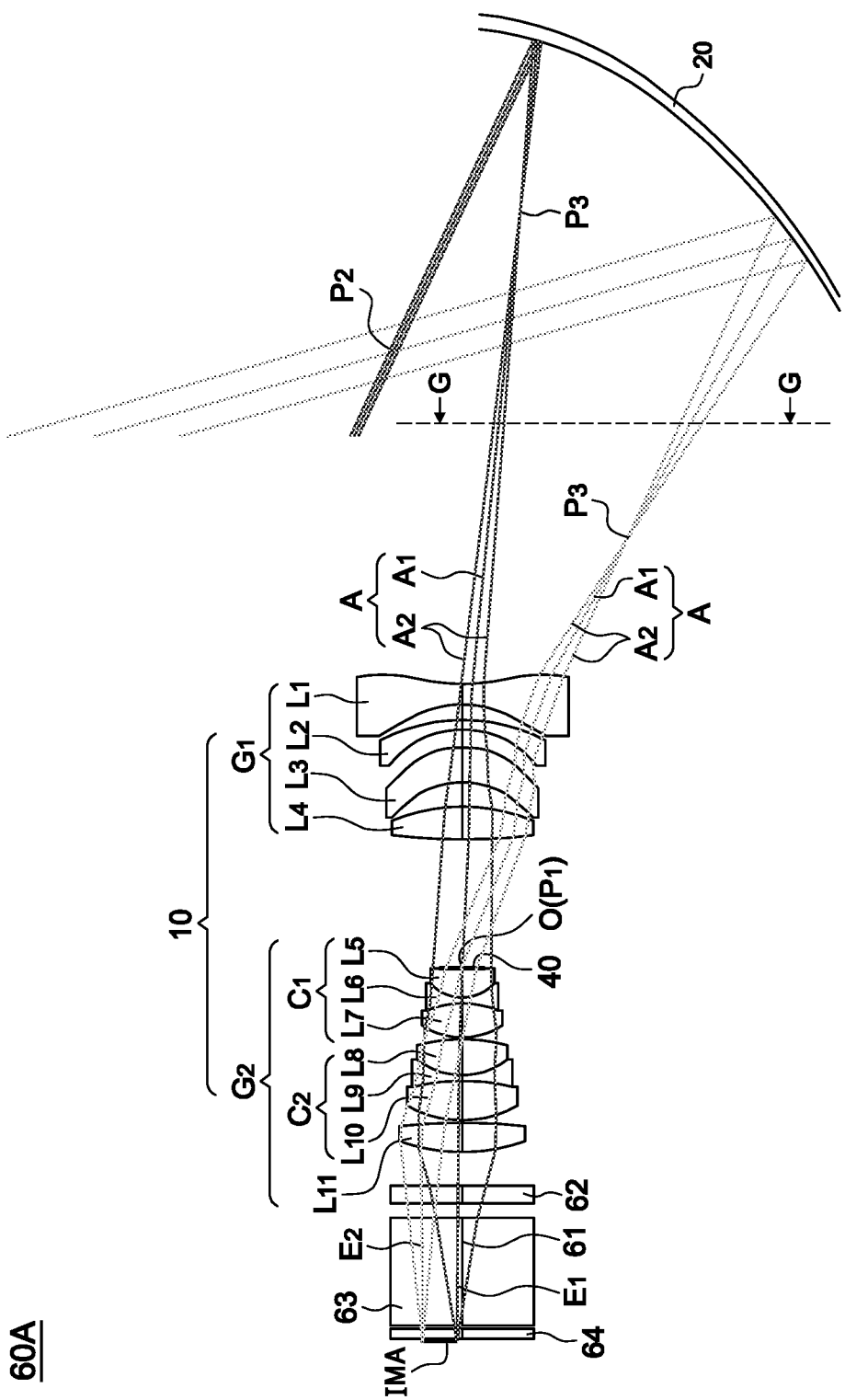
FIG. 1B is a schematic diagram illustrating a travel path of optical path of the first embodiment the present invention.
Figure 1C:
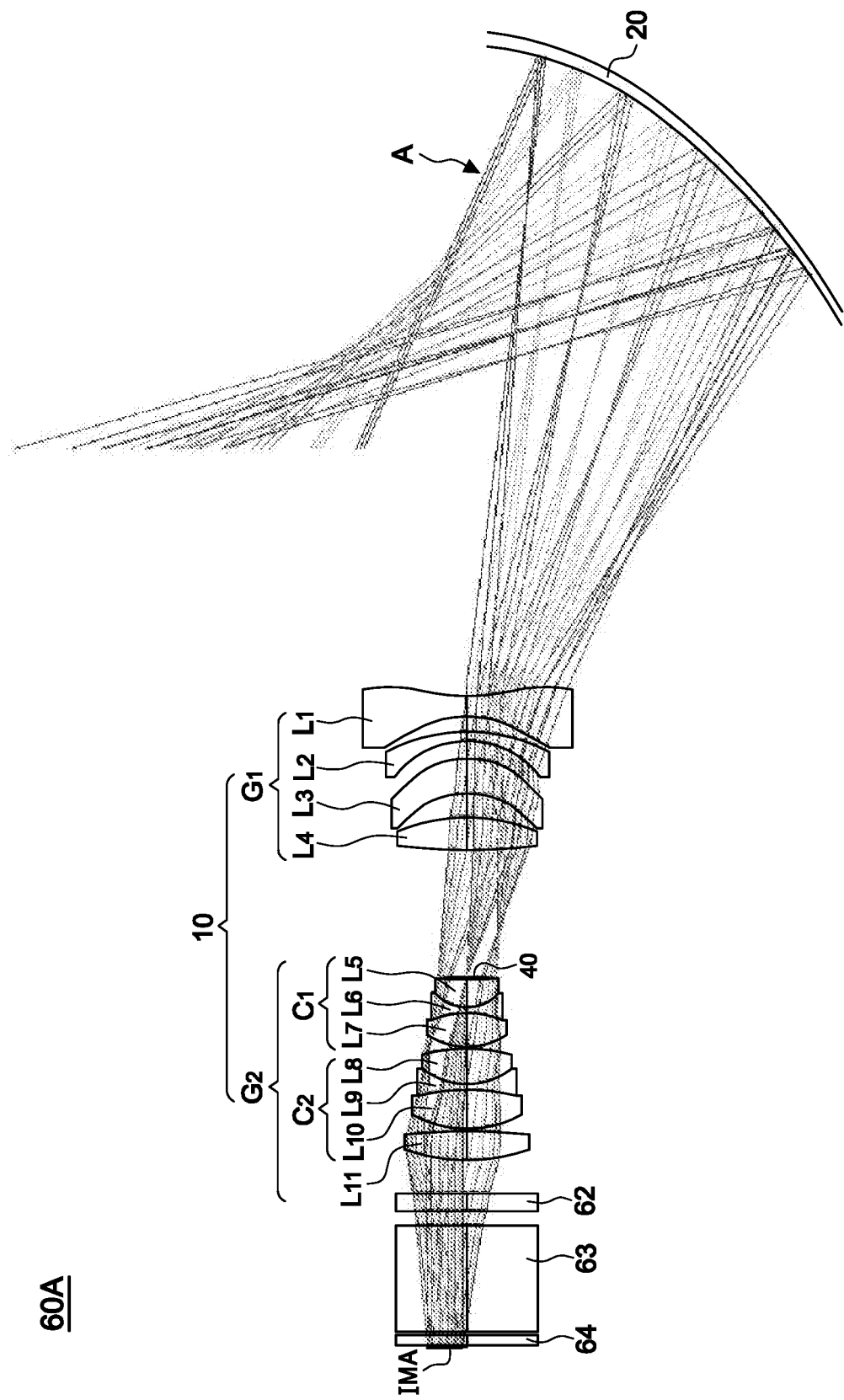
FIG. 1C is a schematic diagram illustrating the optical path of maxima image height which divided into ten equal of the first embodiment.
Figure 1E:
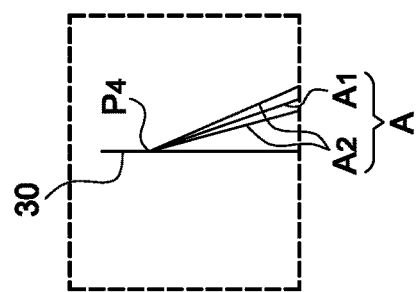
FIG. 1E is the zoom in of the 1E in the FIG. 1D.
Figure 1F:
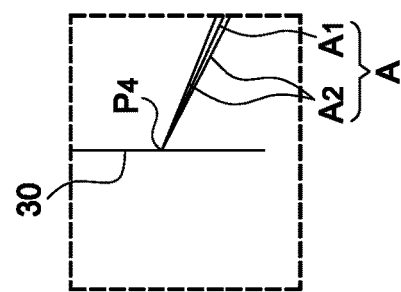
FIG. 1F is the zoom in of the 1F in the FIG. 1D.
Figure 1D:
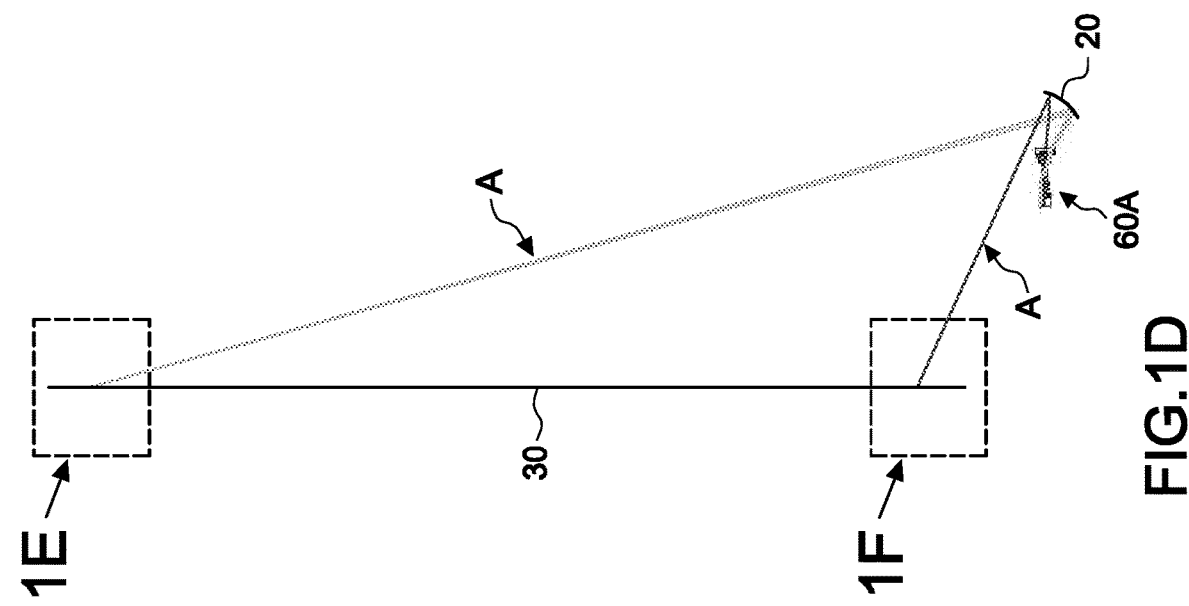
FIG. 1D is a schematic diagram illustrating the image of the first embodiment the present invention.
Figure 1G:
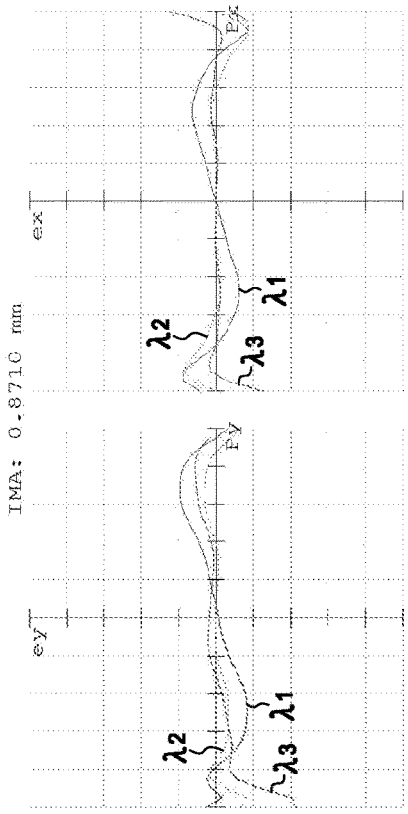
FIG. 1G is a ray fan plot showing an image height of 0.5830 mm of the image source of the first embodiment of the present invention.
Figure 1H:
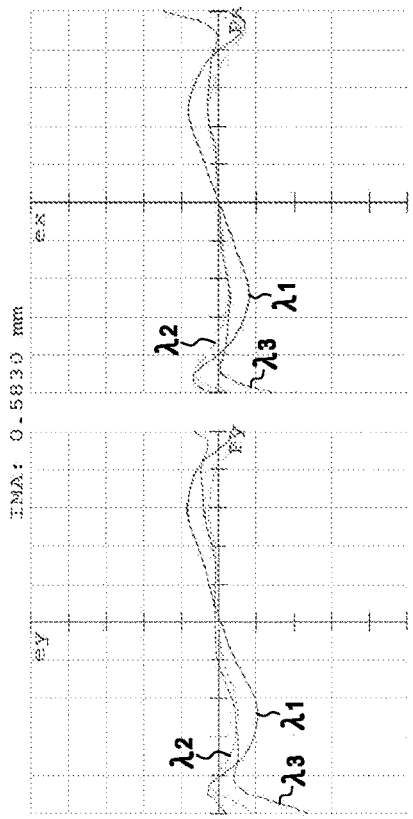
FIG. 1H is a ray fan plot showing an image height of 0.8710 mm of the image source of the first embodiment of the present invention.
Figure 1I:
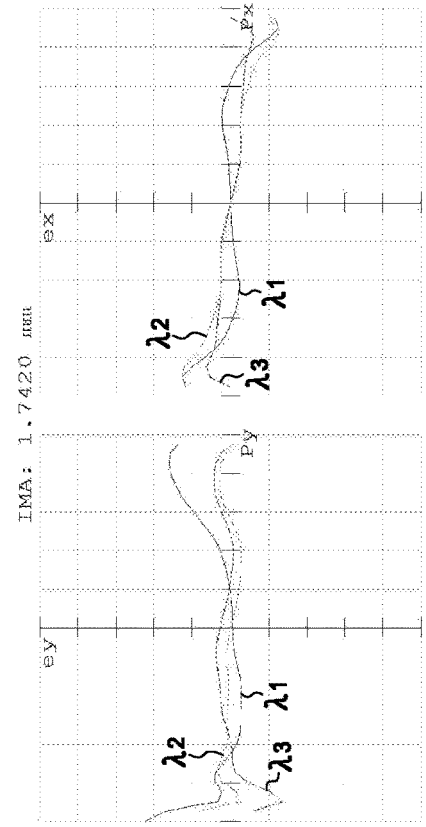
FIG. 1I is a ray fan plot showing an image height of 1.7420 mm of the image source of the first embodiment of the present invention.
Figure 1N:
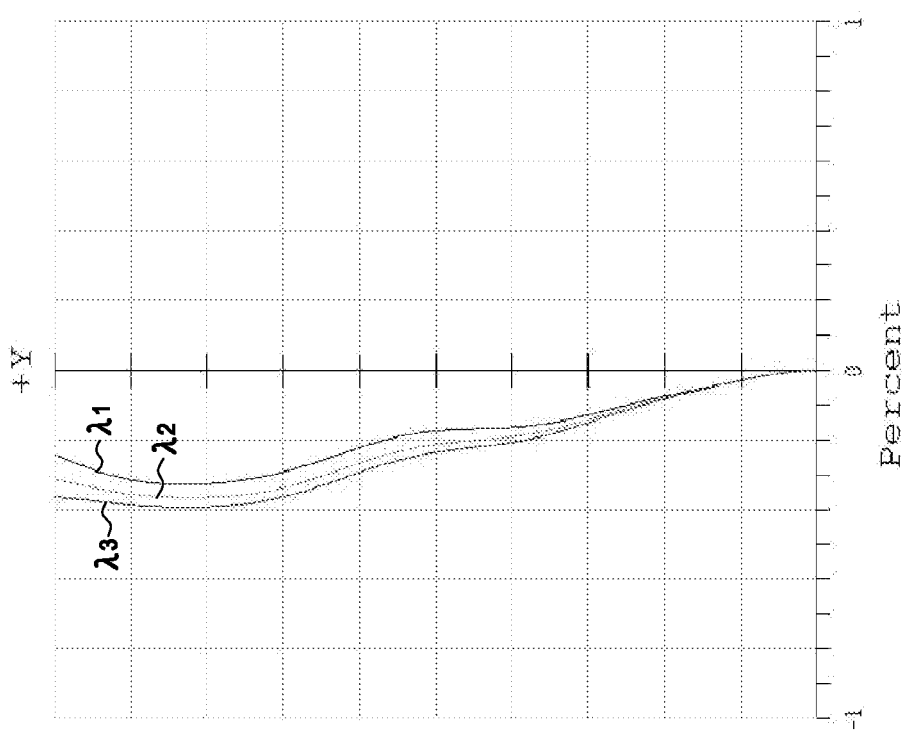
FIG. 1N is a graph illustrating the distortion of the first embodiment.
Figure 1M:
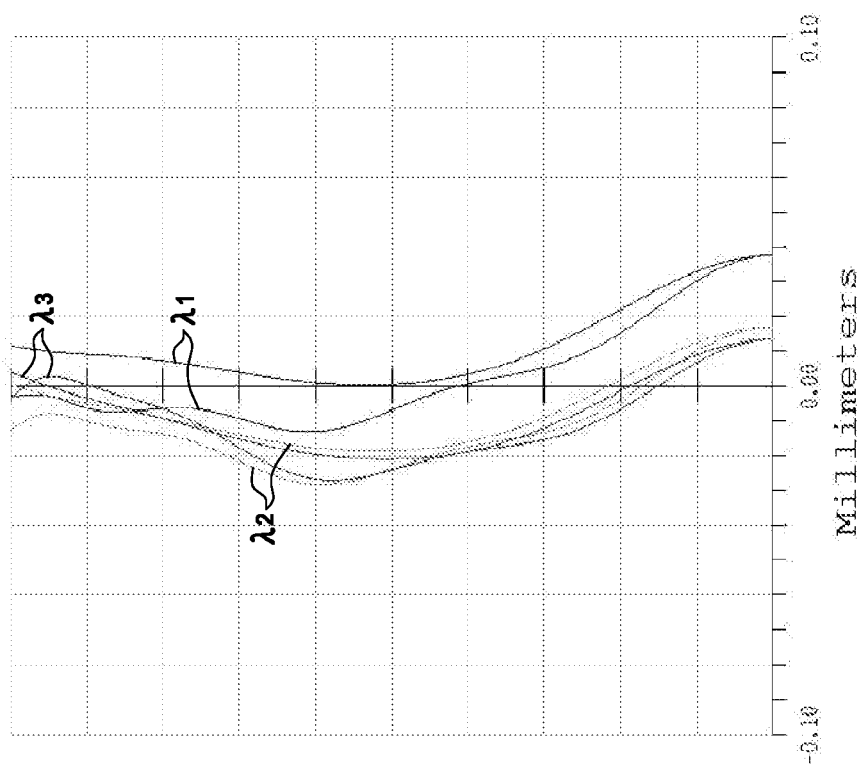
FIG. 1M is a graph illustrating the field curvature of the first embodiment.
Figure 10:
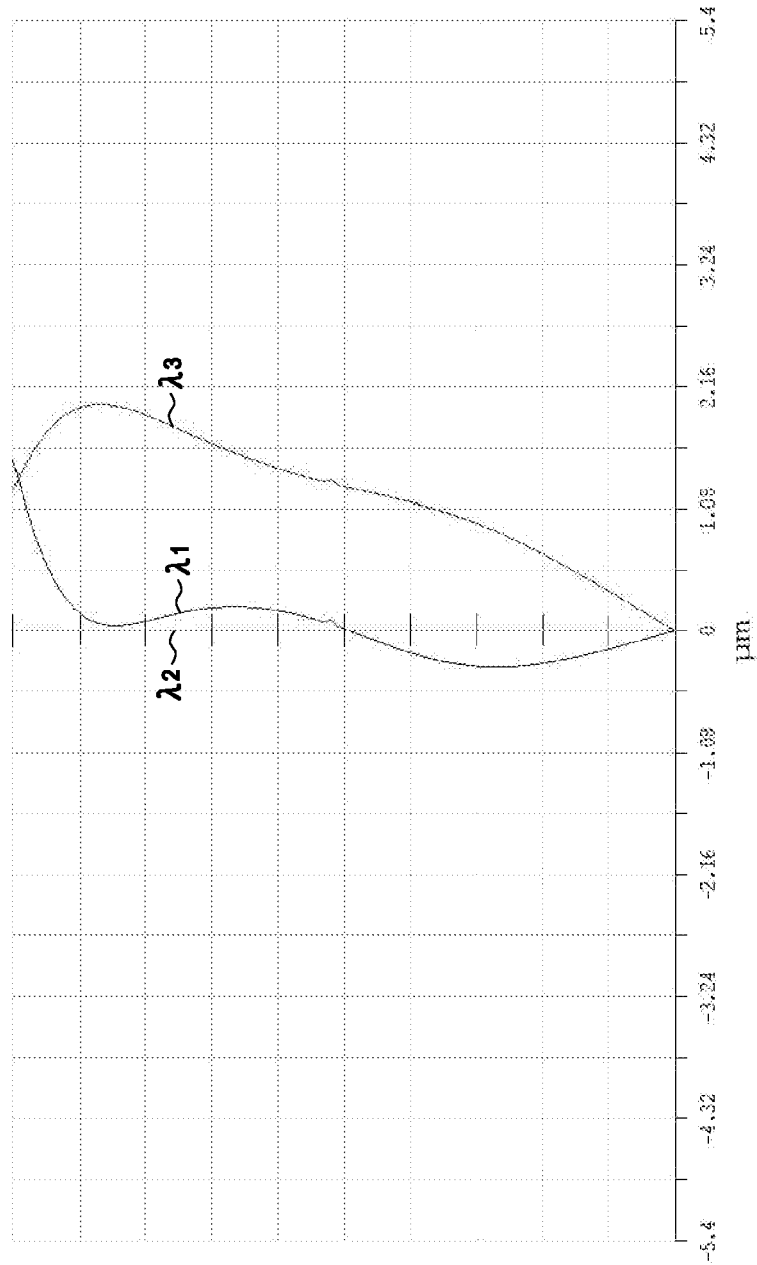
Figure 1P:
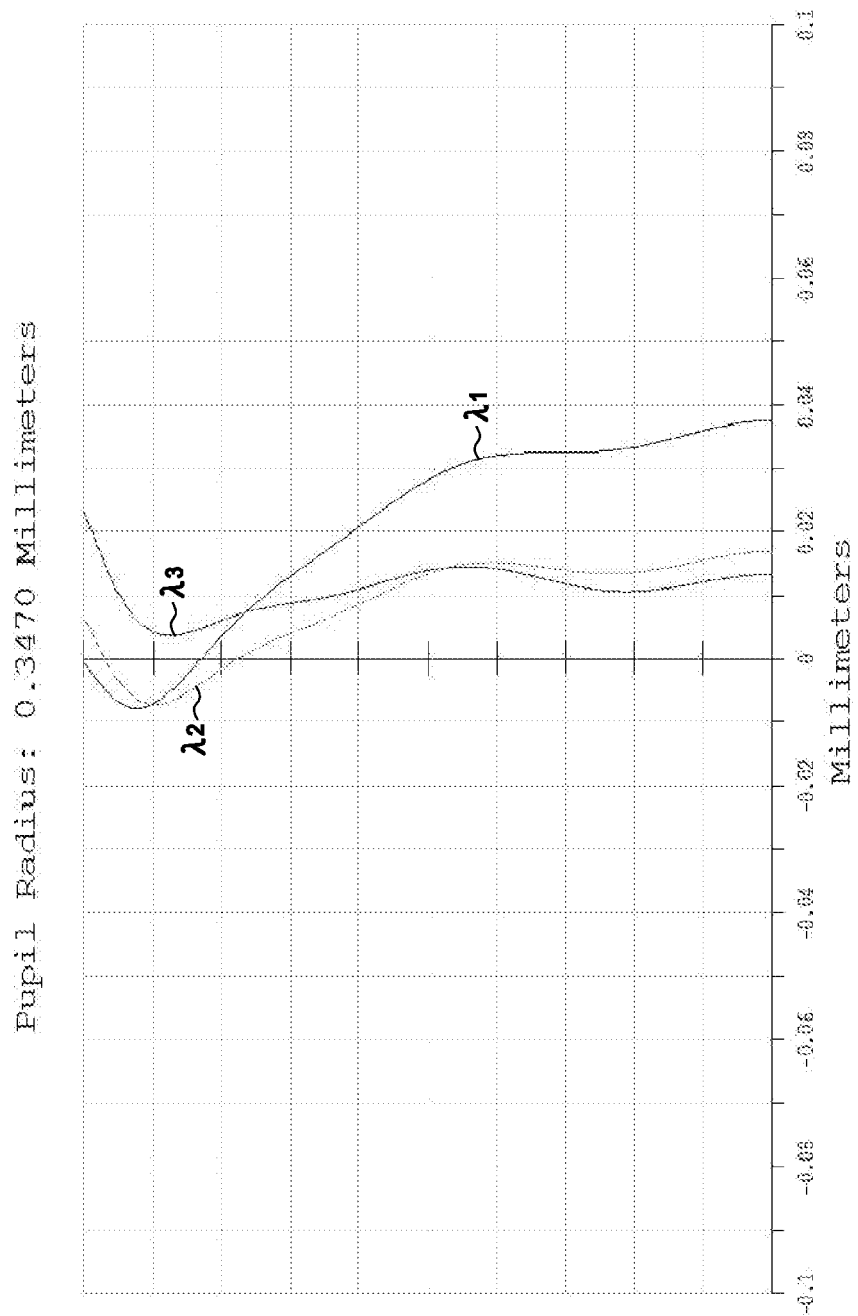
FIG. 1P is a graph illustrating the vertical aberration of the first embodiment.
Figure 1Q:
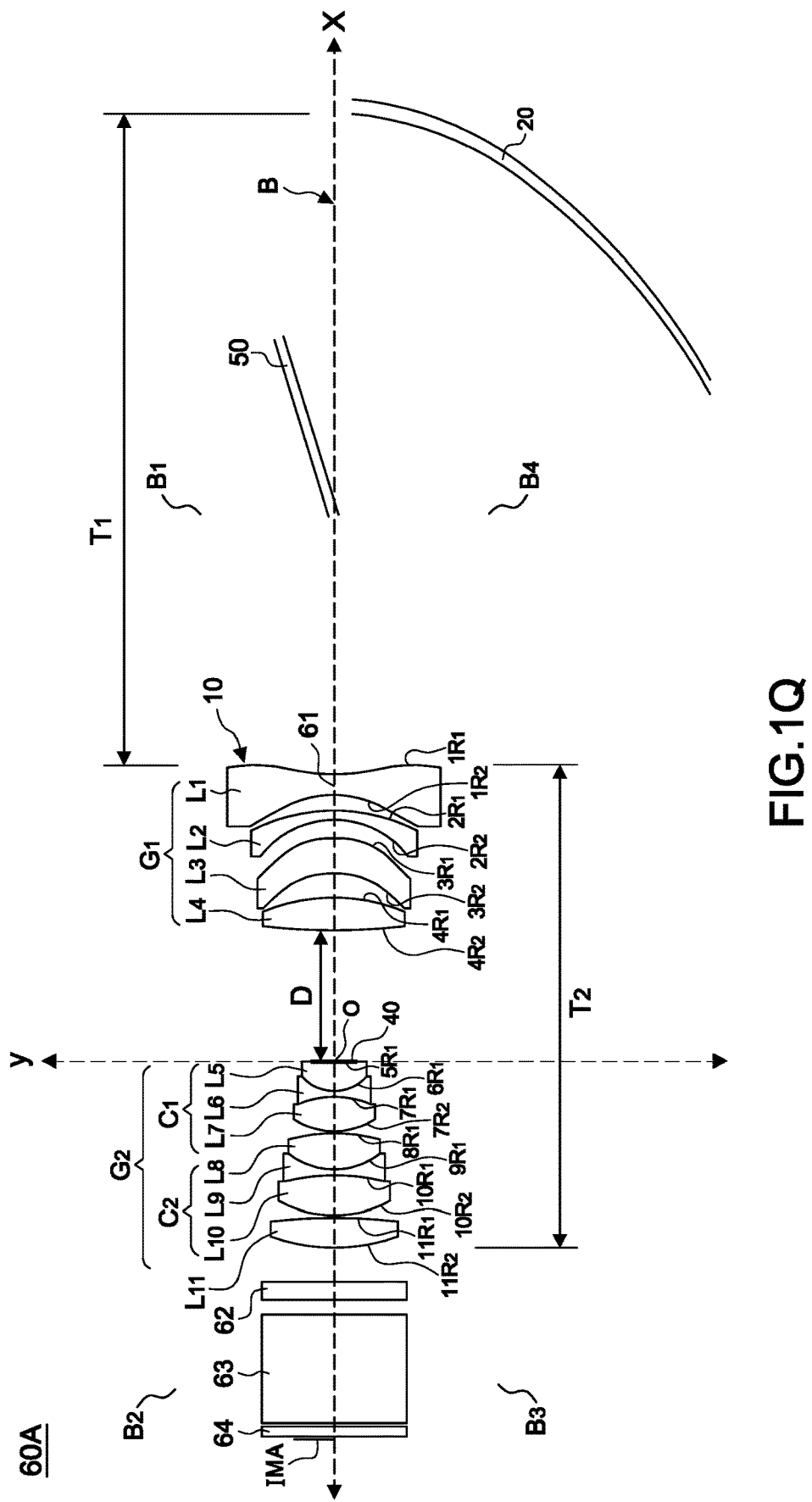
FIG. 1Q is schematic diagram illustrating the optical elements of the first embodiment.

Referring to FIGS. 1A-1Q, a projection optical system with a concave reflector in the projection lens 60A of the first embodiment of the present invention mainly comprises a projection optical system image source IMA, in this embodiment, the image source IMA can be coordinate with a transmissive smooth picture actuator 62, a prism 63, a cover glass 64, but the present invention is not limited to such application.

A lens group 10 arranged at the lateral side of the image source IMA; a reflector 20 arranged at the lateral side of the lens group 10; an image 30, the lens group 10 and the reflector 20 form multiple optical paths A between the image 30 and image source IMA, each optical path A has a chief ray $A_1$ and a marginal ray $A_2$.

Moreover, the lens group 10 can be divided into a front group lens $G_1$ and a rear group lens $G_2$, the front group lens $G_1$ is close to the reflector 20 side, and the rear group lens $G_2$ is close to the image source side IMA.

Also, the front group lens $G_1$ includes at least two aspheric lens, and at least one of the aspheric lens is a negative lens; the rear group lens $G_2$ includes at least two doublet and an aspheric lens; the Nd of the last lens is 1.8-2.05 and the Abbe number of the last lens of the rear group lens $G_2$ is 17-24 and is close to the image source side, but the present invention is not limited to such application.

Referring to the FIG. 1A-1C, Table 1 and Table 2, the projection optical system 60A of the first embodiment has the front group lens $G_1$ includes a first lens $L_1$, a second lens $L_2$, a third lens $L_3$ and a fourth lens $L_4$, wherein the first lens $L_1$ and the third lens $L_3$ are aspheric lens, and the first lens $L_1$ is a negative lens; the two doublet of the rear group lens $G_2$ are formed by bonding a fifth lens $L_5$ and a sixth lens $L_6$ to form a first doublet $C_1$, and by bonding an eighth lens $L_8$, a ninth lens $L_9$ and a tenth lens $L_{10}$ to form a second doublet $C_2$, and the seventh lens $L_7$ is an aspheric lens, the seventh lens $L_7$ can also be an independent lens, or the seventh lens $L_7$ can be bonded with the sixth lens $L_6$ to make the fifth lens $L_5$, the sixth lens $L_6$ and the seventh lens $L_7$ form a first doublet $C_1$; the eleventh lens $L_{11}$ is a single lens and is the last lens, but the present invention is not limited to such application.

TABLE 1

| Surface | Radius(mm) | Thickness(mm) | Refractive index (Nd) | Abbe Number (Vd) |
| --- | --- | --- | --- | --- |
| (MIRROR) | 29.52 | 69.90 | | |
| L1R1 | −18.35 | 2.20 | 1.53 | 56.28 |
| L1R2 | 15.54 | 1.60 | | |
| L2R1 | 19.81 | 1.00 | 1.73 | 54.67 |
| L2R2 | 10.47 | 1.96 | | |
| L3R1 | 19.18 | 3.68 | 1.53 | 56.28 |
| L3R2 | 14.91 | 2.52 | | |
| L4R1 | 19.93 | 3.50 | 1.85 | 23.79 |
| L4R2 | −63.08 | 13.82 | | |
| (APERTURE) | INF | 0.20 | | |
| L5R1 | −53.47 | 3.00 | 1.70 | 41.14 |
| L6R1 | −4.82 | 0.60 | 1.80 | 46.57 |
| L7R1 | 10.00 | 3.66 | 1.52 | 64.07 |
| L7R2 | −8.76 | 0.20 | | |
| L8R1 | 19.93 | 3.80 | 1.50 | 81.59 |
| L9R1 | −8.18 | 0.60 | 1.85 | 23.79 |
| L10R1 | 23.61 | 4.23 | 1.50 | 81.59 |
| L10R2 | −12.99 | 0.20 | | |
| L11R1 | 55.19 | 3.18 | 1.92 | 18.90 |
| L11R2 | −20.91 | 3.50 | | |

TABLE 2

| ASPH | MIRROR | $1R_1$ | $1R_2$ | $3R_1$ | $3R_2$ | $7R_1$ | $7R_2$ |
| --- | --- | --- | --- | --- | --- | --- | --- |
| Radius | 29.52 | −18.35 | 15.54 | 19.18 | 14.91 | 10.00 | −8.76 |
| Conic | −1.12 | 0.00 | 1.34 | 0.00 | 0.00 | 0.00 | 2.09 |
| 4TH | −1.34E−06 | 3.14E−04 | 5.16E−04 | 1.50E−03 | 1.07E−03 | 0.00E+00 | 3.54E−04 |
| 6TH | 2.27E−09 | −2.38E−06 | −6.26E−06 | −2.99E−05 | −2.04E−05 | 0.00E+00 | −6.11E−06 |
| 8TH | −1.74E−12 | 2.32E−08 | −2.49E−07 | 5.03E−07 | 6.66E−07 | 0.00E+00 | 4.03E−06 |
| 10th | 1.13E−15 | −1.78E−10 | 7.85E−09 | −7.50E−09 | −2.16E−08 | 0.00E+00 | −5.30E−07 |
| 12th | −4.24E−19 | 1.02E−12 | −1.05E−10 | 6.76E−10 | 3.77E−10 | 0.00E+00 | 4.14E−08 |
| 14th | 7.24E−23 | −3.72E−15 | 7.19E−13 | −2.79E−13 | −3.34E−12 | 0.00E+00 | −1.64E−09 |
| 16th | 0.00E+00 | 6.49E−18 | −2.09E−15 | 2.69E−16 | 1.21E−14 | 0.00E+00 | 2.74E−11 |

An aperture 40 arranged inside the lens group 10 and the center of the aperture 40 is defined as an origin O, define the axial direction as X axis X and the radial direction as Y axis Y to form a rectangular coordinate system B, the rectangular coordinate system B has a first quadrant $B_1$, a second quadrant $B_2$, a third quadrant $B_3$ and a fourth quadrant $B_4$, and the projection optical system 60A has an optical axis 61 which coincided with the X axis X making the chief ray $A_1$ of one of the optical paths A forms a chief ray $A_1$ of a paraxial image height $E_1$ at the part where image source IMA be near to the optical axis 61, the chief ray $A_1$ of another one of the optical paths A forms a marginal ray $A_2$ of an off-axis image height $E_2$ at the part where image source IMA be far from the optical axis 61.

Referring to FIGS. 1D-1F, when the image source IMA and the image 30 are located in the second quadrant $B_2$ and the reflector 20 is located in the fourth quadrant $B_4$, the chief ray $A_1$ of the paraxial image height $E_1$ intersects with the chief ray $A_1$ of the off-axis image height $E_2$, then sequentially forming a first point $P_1$ and a second point $P_2$, the first point $P_1$ located at the origin O and the second point $P_2$ is located in the first quadrant $B_1$, and the chef ray $A_1$ of the optical path A intersects with the marginal ray $A_2$ of the optical path A, and sequentially forming a third point $P_3$ and a fourth point $P_4$, the third point $P_3$ located at the fourth quadrant $B_4$ and the fourth point $P_4$ is located in the second quadrant $B_2$.

The projection optical system 60A set the first wave length $\lambda_1$, the second wave length $\lambda_2$, the third wave length $\lambda_3$ as 0.450 um, 0.540 um and 0.630 um, and each of them can simulate different graphs illustrating the ray fan plot of FIGS. 1G-1L, and the same image source IMA can present different image height, 0.5830 mm, 0.8710 mm, 1.7420 mm, 2.6130 mm, 3.4840 mm, 4.3500 mm, and the mark ey, py, ex and px represents the lateral aberration of Y axis, the pupil distance of Y axis, the lateral aberration of X axis and the pupil distance of X axis, wherein the maximum scale the lateral aberration of Y axis and the lateral aberration of X are ±20.000 um, and the pupil distance of Y axis the pupil distance of X axis is a normalized ratio; The field curvature graph FIG. 1M and the distortion graph FIG. 1N has maximum field 4.355 mm; The lateral color aberration graph FIG. 1O has maximum field 4.355 mm; The vertical aberration graph FIG. 1P has pupil radius 0.3470 mm, with the above simulation curve and data can prove the projection optical system 60A maintain good image quality. Furthermore, as FIG. 1Q showing, between the reflector 20 and the image 30 include at least an optical element 50 for deflecting the optical path or correcting aberrations, but the present invention is not limited to such application.

In this embodiment, the Abbe number Vd of the 11$^{th}$ lens of the rear group lens $G_2$ that is closest to the image source IMA side is 18.9, the Nd thereof is 1.92, the Abbe number Vd is 18.9, and it complies the requirement of the projection optical system 60A that the Nd is 1.8-2.05, the Abbe number Vd is between 16-35; the Fno (F-number) of the projection optical system 60A is 1.8, it complies the requirement of the projection optical system 60A that the Fno (F-number) is between 1.6-3.2; moreover, in this embodiment, the width W of the image 30 is 1439, the value of the projection distance T from the reflector 20 to the image 30 is 360, so the projection ratio T/W is 0.25, thus conforms to the conditional formula of the projection ratio of the projection optical system: 0.16<T/W<0.3; the displacement d of a center point of the image source corresponding to the optical axis is 2.04, the short side h of the image source is 2.92, so 2d/h is 140%, thus conforms the requirement of the projection optical system 60A that 130%<2d/h<160%; moreover, in this embodiment, the focal length F1 of the reflector 20 is set as 14.76, the focal length F2 of the lens group 10 is set as 5.49, so F1/F2 is 2.69, thus conforms the requirement of the projection optical system 60A that 2.2<F1/F2<3.0; the maximum image height of the projection optical system 60A is 4.355, the projection ratio is 0.25, the Fno is 1.8, the ratio of IMH/TR/Fno is 9.67, thus conforms to the conditional formula 8<IMH/TR/Fno<11; and the maximum image height of the projection optical system 60A is 4.355, the distance T1 from the reflector 20 to the lens group 10 is 69.9, and the total length T2 of the lens group is 49.95, so the ratio of IMH*T1/T2 is 6.09, which conforms to the conditional formula 5<IMH*T1/T2<8. The first to fourth embodiment are having the same features above mentioned, therefore, they are technically interrelated and belong to a broad concept of invention, conform to the principle of unity, the only difference is the front group lens $G_1$ and the second group lens $G_2$ are slightly different.

Figure 2B:
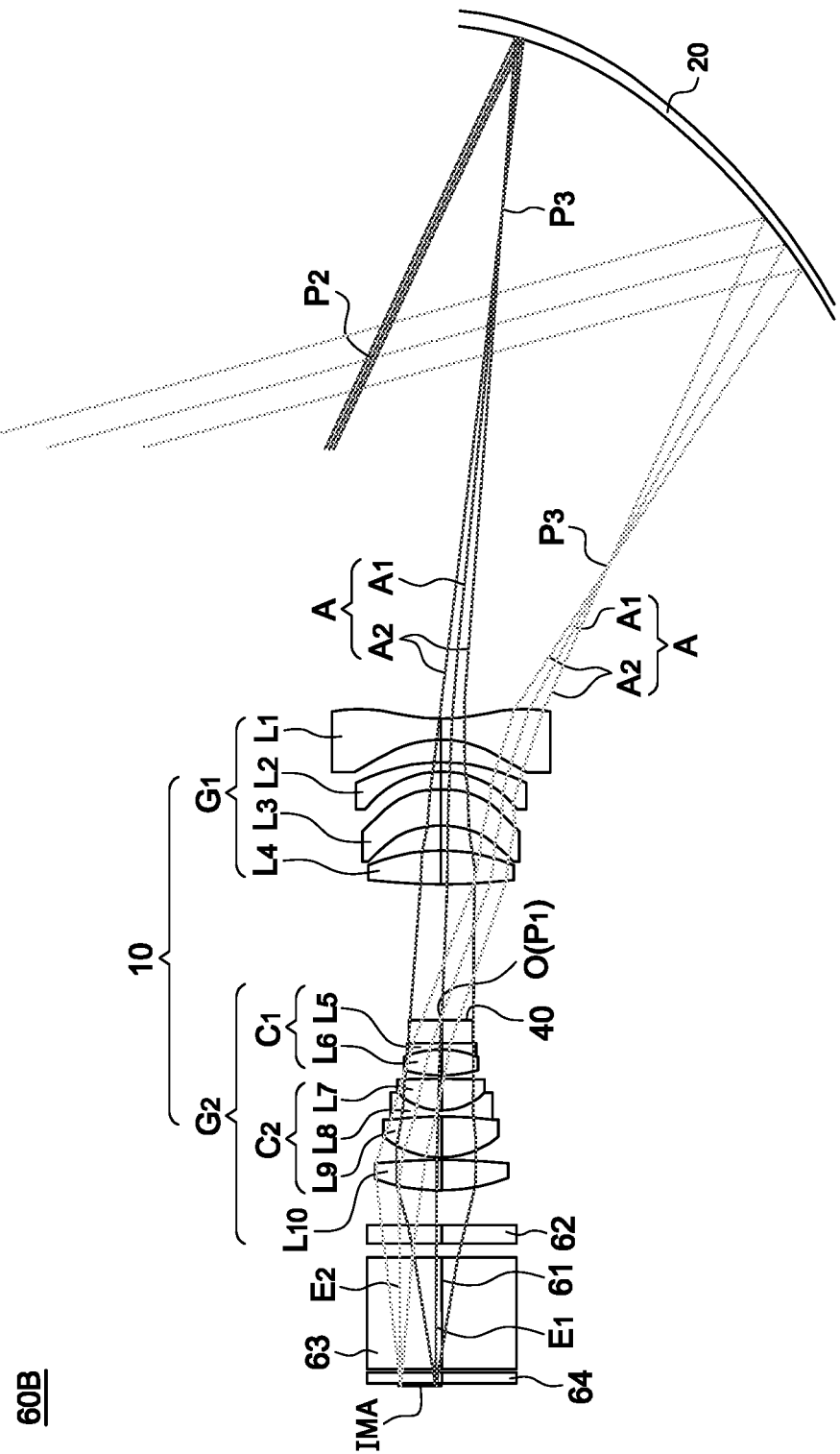
FIG. 2B is a schematic diagram illustrating a travel path of optical path of the second embodiment the present invention.
Figure 2C:
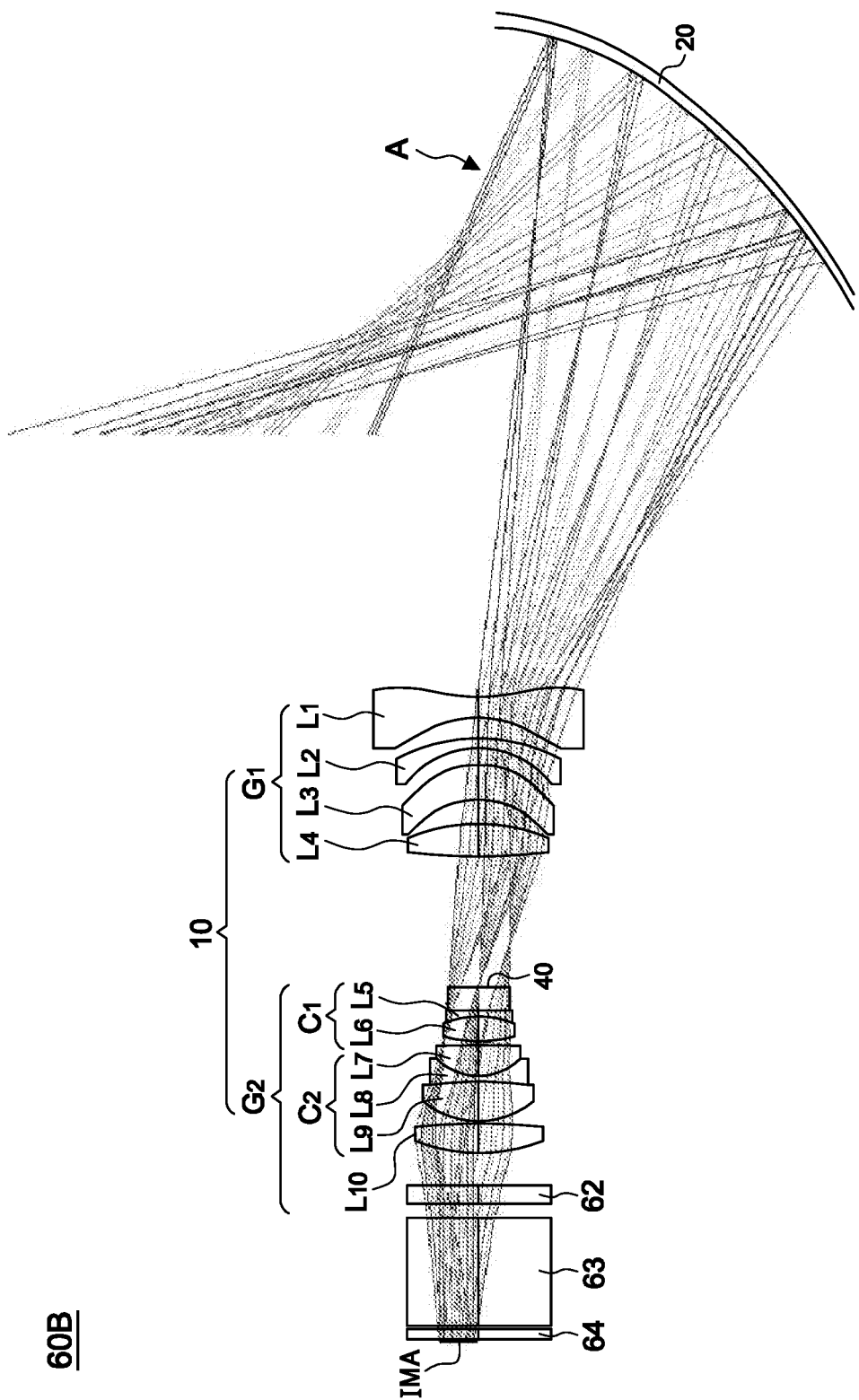
FIG. 2C is a schematic diagram illustrating the optical path of maxima image height which divided into ten equal of the second embodiment.

Referring to the FIGS. 2A-2C, Table 3 and Table 4, the projection optical system 60B of the second embodiment has the front group lens $G_1$ includes a first lens $L_1$, a second lens $L_2$, a third lens $L_3$ and a fourth lens $L_4$, wherein the first lens $L_1$ and the third lens $L_3$ are aspheric lens, and the first lens $L_1$ is a negative lens; the two doublet of the rear group lens $G_2$ are formed by bonding a fifth lens $L_5$ and a sixth lens $L_6$ to form a first doublet $C_1$, and by bonding a seventh lens $L_7$, an eighth lens $L_8$ and ninth lens $L_9$ to form a second doublet $C_2$, and the sixth lens $L_6$ are aspheric lens; the tenth lens $L_{10}$ is a single lens and the last lens, but the present invention is not limited to such application.

TABLE 3

| Surface | Radius (mm) | Thickness (mm) | Refractive index (Nd) | Abbe number (Vd) |
|---|---|---|---|---|
| (MIRROR) | 29.52 | 71.35 | | |
| L1R1 | −18.35 | 2.20 | 1.53 | 56.28 |
| L1R2 | 15.54 | 2.26 | | |
| L2R1 | 19.81 | 1.00 | 1.73 | 54.67 |
| L2R2 | 10.47 | 1.80 | | |
| L3R1 | 19.18 | 3.68 | 1.53 | 56.28 |
| L3R2 | 14.91 | 2.52 | | |
| L4R1 | 19.93 | 3.50 | 1.85 | 23.79 |
| L4R2 | −63.08 | 13.96 | | |
| (APERTURE) | INF | 2.45 | | |
| L5R1 | 702.62 | 0.60 | 1.80 | 46.57 |
| L6R1 | 9.59 | 2.70 | 1.52 | 64.07 |
| L6R2 | −15.27 | 0.20 | | |
| L7R1 | 34.80 | 3.45 | 1.50 | 81.59 |
| L8R1 | −6.77 | 0.60 | 1.85 | 23.79 |
| L9R1 | 50.59 | 4.28 | 1.50 | 81.59 |
| L9R2 | −9.78 | 0.20 | | |

TABLE 3-continued

| Surface | Radius (mm) | Thickness (mm) | Refractive index (Nd) | Abbe number (Vd) |
|---|---|---|---|---|
| L10R1 | 75.14 | 3.10 | 1.92 | 18.90 |
| L10R2 | −20.00 | 3.50 | | |

TABLE 4

| ASPH | MIRROR | $1R_1$ | $1R_2$ | $3R_1$ | $3R_2$ | $6R_1$ | $6R_2$ |
|---|---|---|---|---|---|---|---|
| Radius | 29.52 | −18.35 | 15.54 | 19.18 | 14.91 | 9.59 | −15.27 |
| Conic | −1.12 | 0.00 | 1.34 | 0.00 | 0.00 | 0.00 | 4.62 |
| 4TH | −1.34E−06 | 3.14E−04 | 5.16E−04 | 1.50E−03 | 1.07E−03 | 0.00E+00 | 2.64E−04 |
| 6TH | 2.27E−09 | −2.38E−06 | −6.26E−06 | −2.99E−05 | −2.04E−05 | 0.00E+00 | −2.73E−05 |
| 8TH | −1.74E−12 | 2.32E−08 | −2.49E−07 | 5.03E−07 | 6.66E−07 | 0.00E+00 | 9.16E−06 |
| 10th | 1.13E−15 | −1.78E−10 | 7.85E−09 | −7.50E−09 | −2.16E−08 | 0.00E+00 | −1.43E−06 |
| 12th | −4.24E−19 | 1.02E−12 | −1.05E−10 | 6.76E−11 | 3.77E−10 | 0.00E+00 | 1.19E−07 |
| 14th | 7.24E−23 | −3.72E−15 | 7.19E−13 | −2.79E−13 | −3.34E−12 | 0.00E+00 | −5.03E−09 |
| 16th | 0.00E+00 | 6.49E−18 | −2.09E−15 | 2.69E−16 | 1.21E−14 | 0.00E+00 | 8.51E−11 |

In second embodiment, the Abbe number Vd of the $10^{th}$ lens of the rear group lens $G_2$ that is closest to the image source IMA side is 18.9, the Nd is 1.92, it complies the requirement of the projection optical system 60B that the Abbe number Vd is between 16-35 and the Nd is between 1.8-2.05; the Fno (F-number) of the projection optical system 60B is 1.8, it complies the requirement of the projection optical system 60B that the Fno (F-number) is between 1.6-3.2; moreover, in this embodiment, the width W of the image 30 is 664, the value of the projection distance T from the reflector 20 to the image 30 is 180, so the projection ratio T/W is 0.27, thus conforms to the conditional formula of the projection ratio of the projection optical system: 0.16<T/W<0.3; the displacement d of a center point of the image source corresponding to the optical axis is 2.04, the short side h of the image source is 2.92, so 2d/h is 140%, thus conforms the requirement of the projection optical system 60B that 130%<2d/h<160%; moreover, in this embodiment, the focal length F1 of the reflector 20 is set as 14.76, the focal length F2 of the lens group 10 is set as 5.68, so F1/F2 is 2.60, thus conforms the requirement of the projection optical system 60B that 2.2<F1/F2<3.0; the maximum image height of the projection optical system 60B is 4.355, the projection ratio is 0.27, the Fno is 1.8, the ratio of IMH/TR/Fno is 8.93, thus conforms to the conditional formula 8<IMH/TR/Fno<19; and the maximum image height of the projection optical system 60B is 4.355, the distance T1 from the reflector 20 to the lens group 10 is 71.35, and the total length T2 of the lens group is 48.5, so the ratio of IMH*T1/T2 is 6.41, which conforms to the conditional formula 5<IMH*T1/T2<8.

Figure 3A:
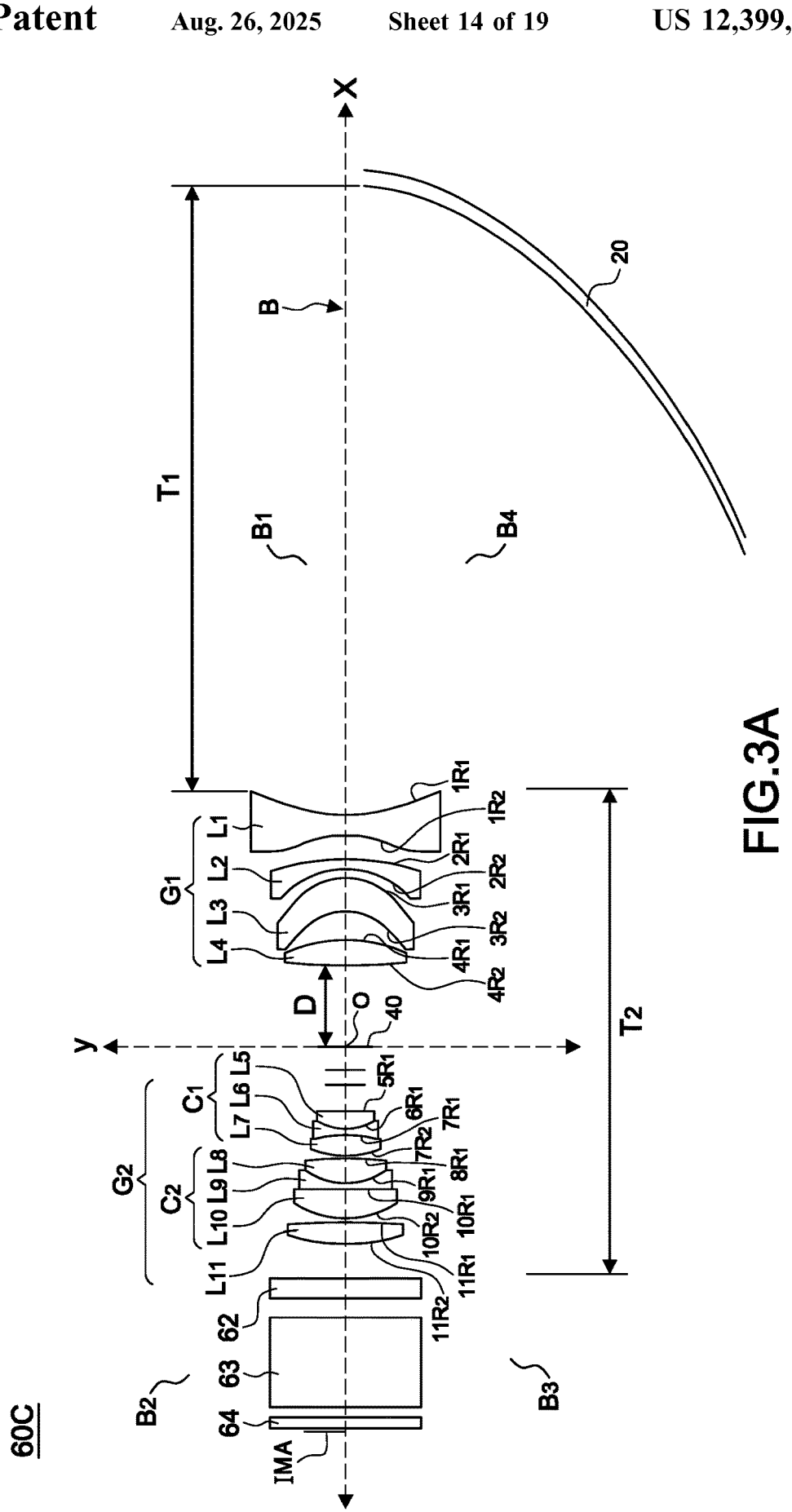
FIG. 3A is a schematic diagram illustrating lenses arrangement of the third embodiment the present invention.
Figure 3B:
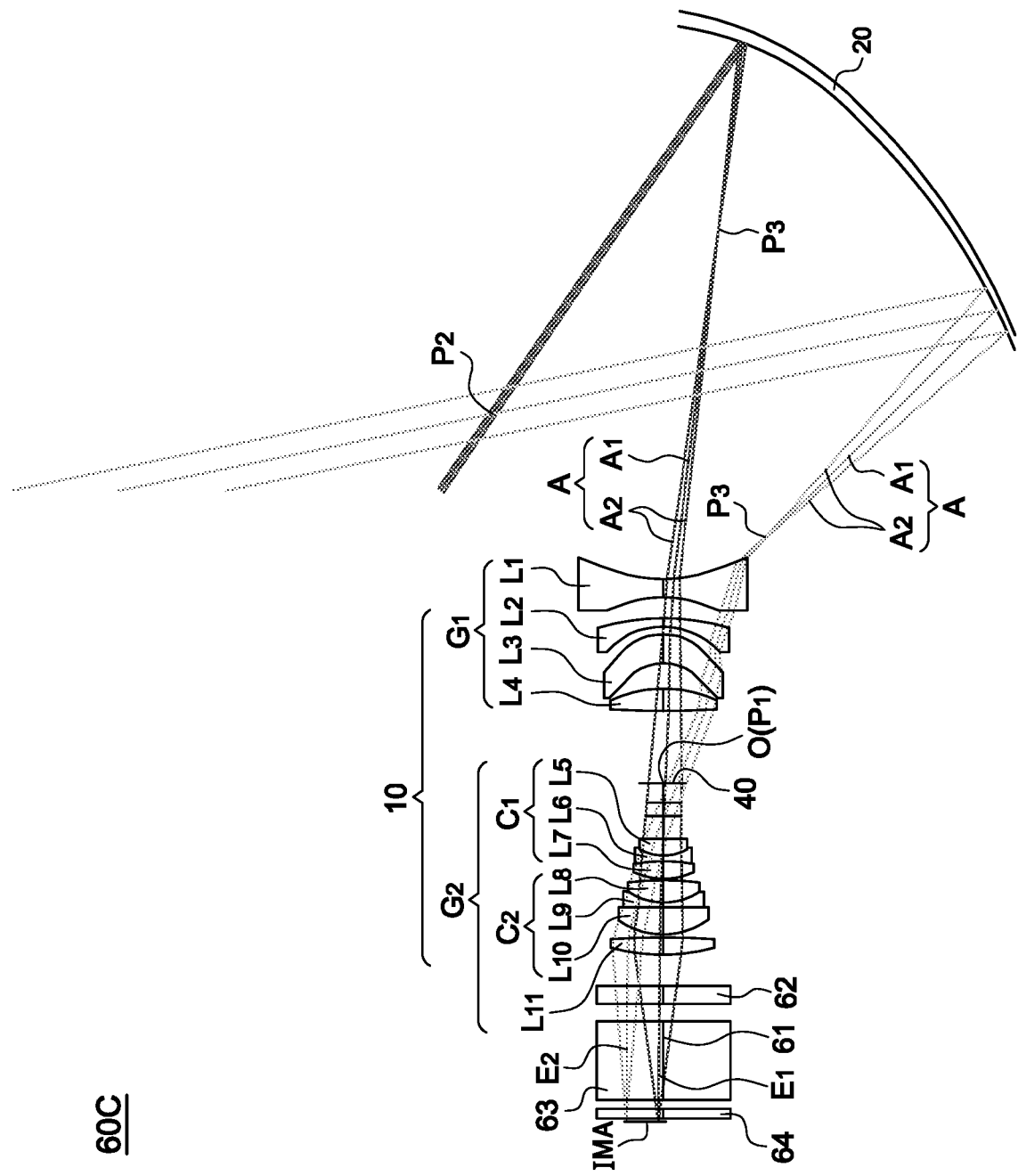
FIG. 3B is a schematic diagram illustrating a travel path of optical path of the third embodiment the present invention.
Figure 3C:
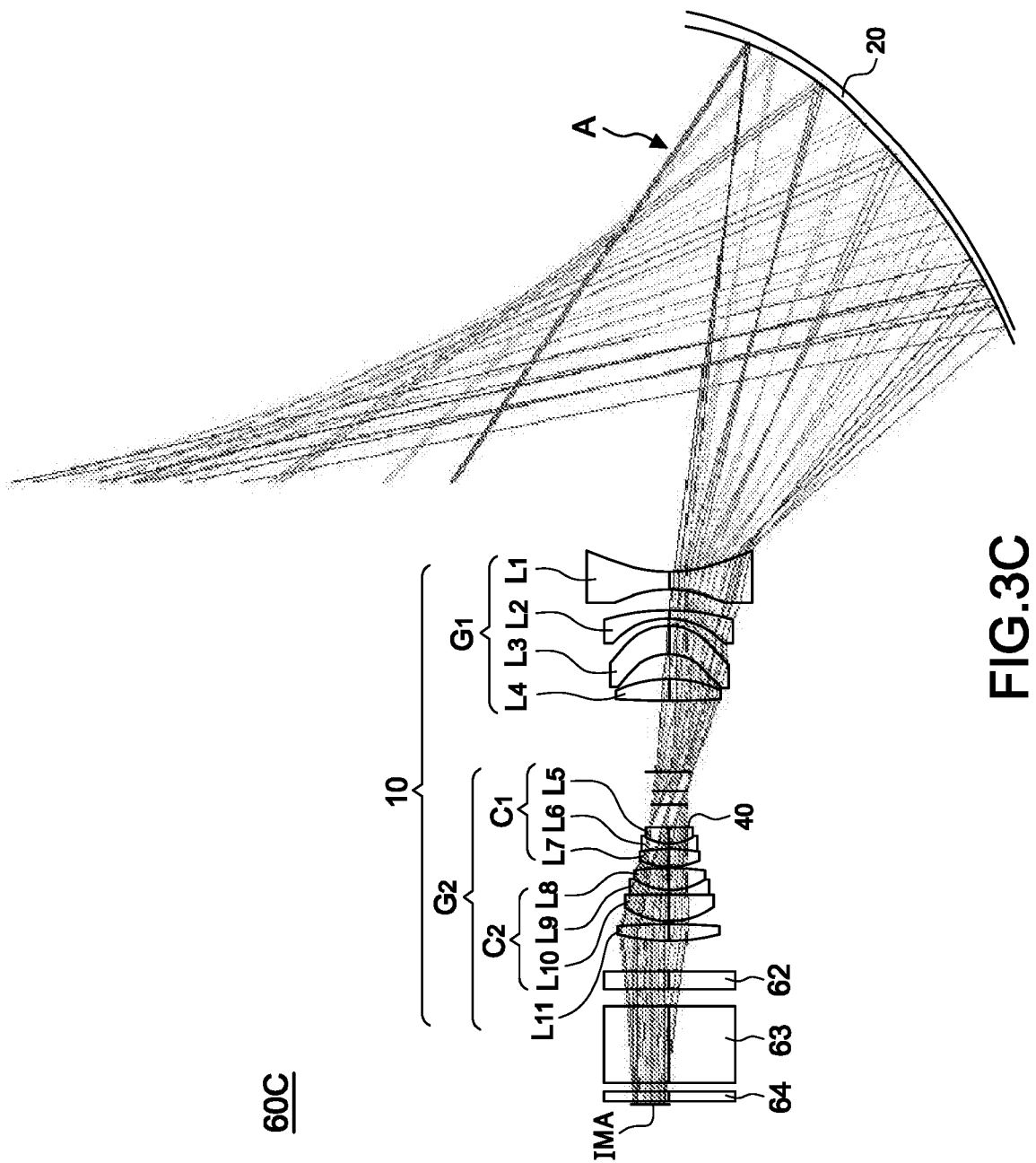
FIG. 3C is a schematic diagram illustrating the optical path of maxima image height which divided into ten equal of the third embodiment.

Referring to the FIGS. 3A-3C, Table 5 and Table 6, the projection optical system 60C of the third embodiment has the front group lens $G_1$ includes a first lens $L_1$, a second lens $L_2$, a third lens $L_3$ and a fourth lens $L_4$, wherein the first lens $L_1$ and the third lens $L_3$ are aspheric lens, and the first lens $L_1$ is a negative lens; the two doublet of the rear group lens $G_2$ are formed by bonding a fifth lens $L_5$, a sixth lens $L_6$ and the seventh lens $L_7$ to form a first doublet $C_1$, and by bonding an eighth lens $L_8$, a ninth lens $L_9$ and a tenth lens $L_{10}$ to form a second doublet $C_2$; the eleventh lens $L_{11}$ is a single lens and the last lens, but the present invention is not limited to such application.

TABLE 5

| Surface | Radius (mm) | Thickness (mm) | Refractive index (Nd) | Abbe Number (Vd) |
|---|---|---|---|---|
| (MIRROR) | 23.58 | 63.19 | | |
| L1R1 | −13.86 | 2.00 | 1.51 | 56.32 |
| L1R2 | 17.97 | 2.45 | | |
| L2R1 | 27.31 | 1.00 | 1.80 | 46.57 |
| L2R2 | 9.56 | 0.84 | | |
| L3R1 | 9.79 | 3.44 | 1.51 | 56.32 |
| L3R2 | 7.80 | 2.80 | | |
| L4R1 | 15.85 | 2.60 | 1.85 | 23.78 |
| L4R2 | −62.60 | 11.88 | | |
| (APERTURE) | INF | 2.66 | | |
| L5R1 | 72.14 | 1.82 | 1.57 | 42.81 |
| L6R1 | −5.99 | 0.60 | 1.83 | 37.21 |
| L7R1 | 13.74 | 2.12 | 1.49 | 70.44 |
| L7R2 | −9.67 | 0.20 | | |
| L8R1 | 29.60 | 2.47 | 1.50 | 81.61 |
| L9R1 | −8.08 | 0.60 | 1.85 | 23.78 |
| L10R1 | 145.99 | 3.05 | 1.50 | 81.61 |
| L10R2 | −9.91 | 0.20 | | |
| L11R1 | 46.17 | 2.18 | 1.92 | 18.90 |
| L11R2 | −23.64 | 3.50 | | |

TABLE 6

| ASPH | MIRROR | L1R1 | L1R2 | L3R1 | L3R2 |
|---|---|---|---|---|---|
| Radius | 23.58 | −13.86 | 17.97 | 9.79 | 7.80 |
| Conic | −1.23 | 0.00 | 0.07 | 0.00 | 0.00 |
| 4TH | −3.02E−06 | 7.76E−04 | 1.83E−03 | 2.59E−03 | 1.44E−03 |
| 6TH | 6.54E−09 | −2.91E−05 | −8.19E−05 | −1.16E−04 | −6.84E−05 |
| 8TH | −5.97E−12 | 7.33E−07 | 1.63E−06 | 5.03E−06 | 5.17E−06 |
| 10th | 3.83E−15 | −1.11E−08 | −2.10E−08 | −1.71E−07 | −2.79E−07 |
| 12th | −1.38E−18 | 9.97E−11 | 1.92E−10 | 3.48E−09 | 7.67E−09 |
| 14th | 2.27E−22 | −4.93E−13 | −1.17E−12 | −3.80E−11 | −1.06E−10 |
| 16th | 0.00E+00 | 1.03E−15 | 3.50E−15 | 1.72E−13 | 5.94E−13 |

In third embodiment, the Abbe number Vd of the 11$^{th}$ lens of the rear group lens $G_2$ that is closest to the image source IMA side is 18.9 and the Nd is 1.92, it complies the requirement of the projection optical system 60C that the Abbe number Vd is between 16-35 and the Nd is 1.8-2.5; the Fno (F-number) of the projection optical system 60C is 2.8, it complies the requirement of the projection optical system 60C that the Fno (F-number) is between 1.6-3.2; moreover, in this embodiment, the width W of the image 30 is 1774, the value of the projection distance T from the reflector 20 to the image 30 is 336, so the projection ratio T/W is 0.19, thus conforms to the conditional formula of the projection ratio of the projection optical system: 0.16<T/W<0.3; the displacement d of a center point of the image source corresponding to the optical axis is 2.11, the short side h of the image source is 2.92, so 2d/h is 145%, thus conforms the requirement of the projection optical system 60B that 130%<2d/h<160%; moreover, in this embodiment, the focal length F1 of the reflector 20 is set as 11.79, the focal length F2 of the lens group 10 is set as 4.83, so F1/F2 is 2.44, thus conforms the requirement of the projection optical system 60C that 2.2<F1/F2<3.0; the maximum image height of the projection optical system 60C is 4.413, the projection ratio is 0.19, the Fno is 2.8, the ratio of IMH*TR/Fno is 8.32, thus conforms to the conditional formula 8<IMH/TR/Fno<19; and the maximum image height of the projection optical system 60C is 4.413, the distance T1 from the reflector 20 to the lens group 10 is 63.19, and the total length T2 of the lens group is 42.91, so the ratio of IMH*T1/T2 is 6.50, which conforms to the conditional formula 5<IMH*T1/T2<8.

Figure 4A:
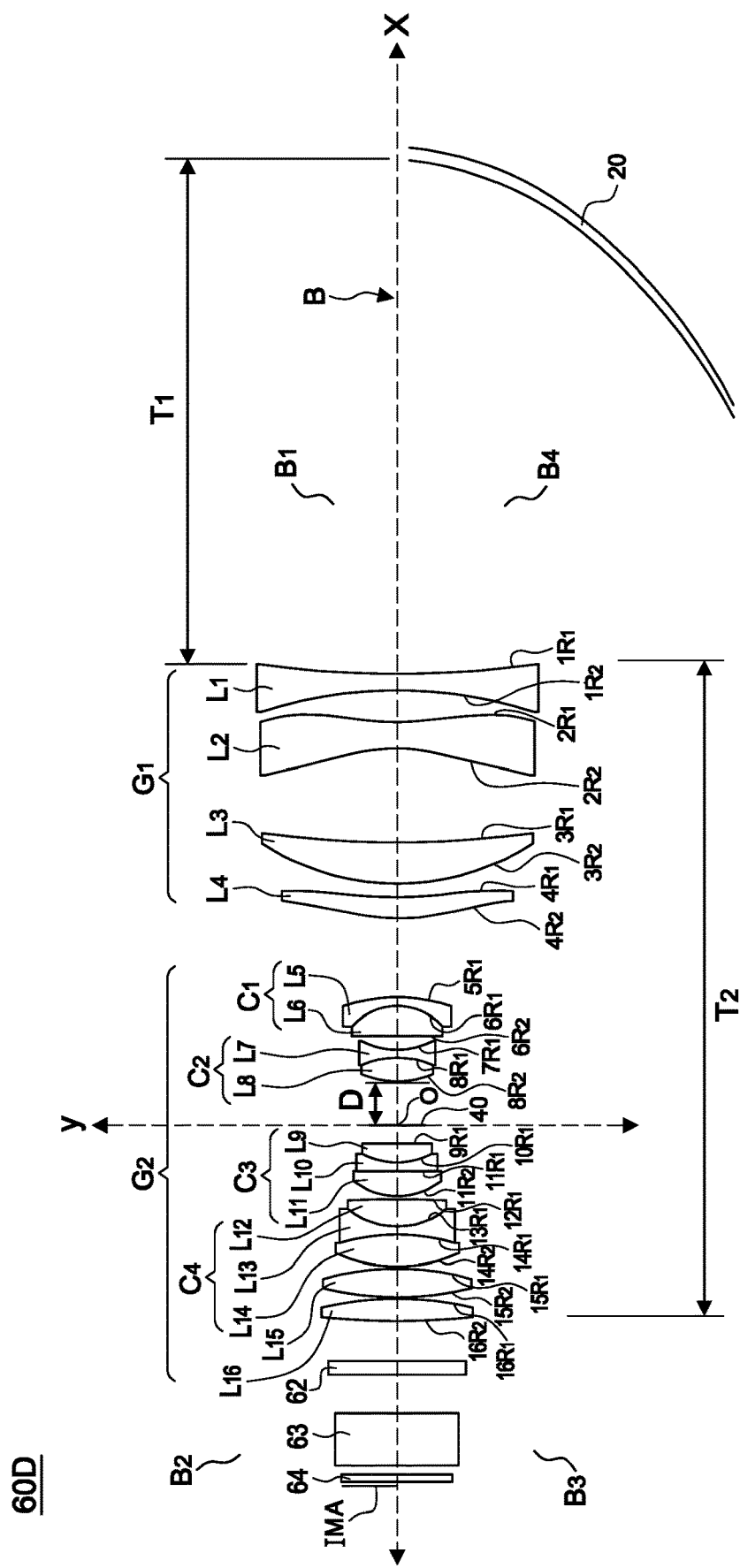
FIG. 4A is a schematic diagram illustrating lenses arrangement of the fourth embodiment the present invention.
Figure 4B:
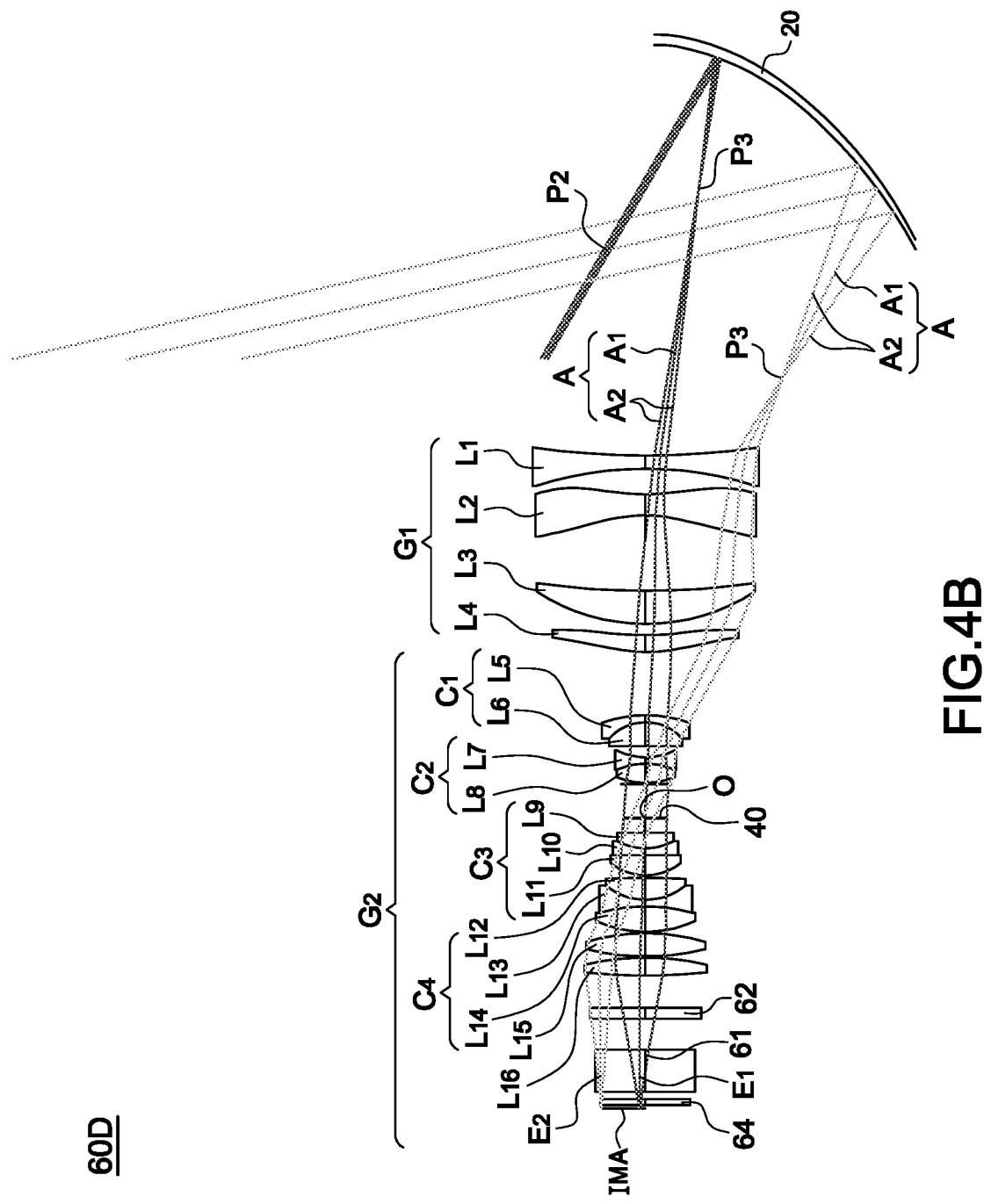
FIG. 4B is a schematic diagram illustrating a travel path of optical path of the fourth embodiment the present invention.
Figure 4C:
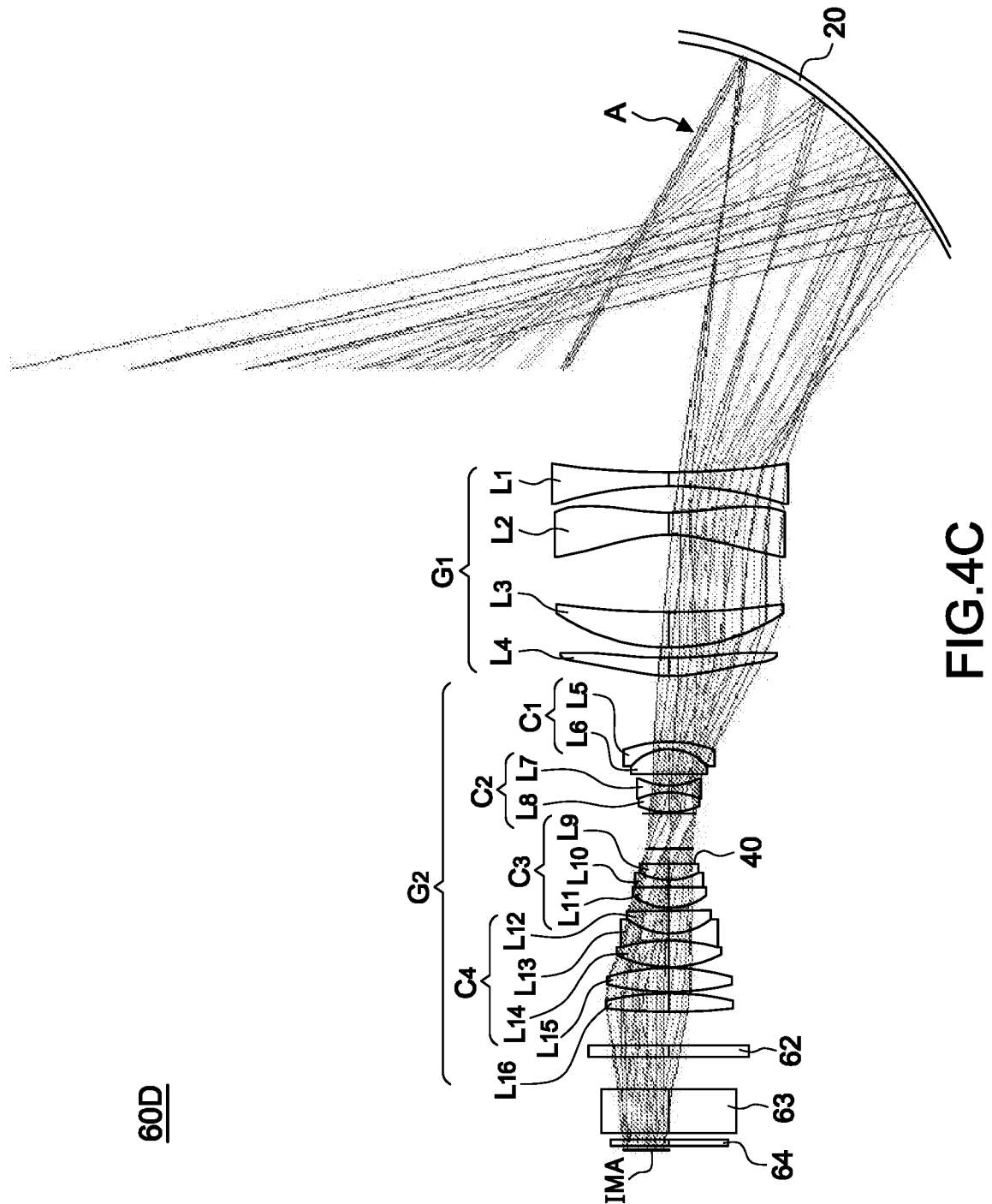
FIG. 4C is a schematic diagram illustrating the optical path of maxima image height which divided into ten equal of the fourth embodiment.

Referring to the FIGS. 4A-4C, Table 7 and Table 8, the projection optical system 60D of the fourth embodiment has the front group lens $G_1$ includes a first lens $L_1$, a second lens $L_2$, a third lens $L_3$ and a fourth lens $L_4$, wherein the second lens $L_2$ and the fourth lens $L_4$ are aspheric lens, and the second lens $L_2$ is a negative lens; the two doublet of the rear group lens $G_2$ are formed by bonding a fifth lens $L_5$ and a sixth lens $L_6$ to form a first doublet $C_1$, by bonding a seventh lens $L_7$ and an eighth lens $L_8$, to form a second doublet $C_2$, by bonding a ninth lens $L_9$, a tenth lens $L_{10}$ and an eleventh lens $L_{11}$ to form a third doublet $C_3$, by bonding a twelfth lens $L_{12}$, a thirteenth lens $L_{13}$ and a fourteenth lens $L_{14}$ to form a fourth doublet $C_4$, and the fifteenth lens $L_{15}$ and the sixteenth lens $L_{16}$ are aspheric lens, the sixteenth lens $L_{16}$ is the last lens, but the present invention is not limited to such application.

TABLE 7

| Surface | Radius | Thickness | Refractive index (Nd) | Abbe Number (Vd) |
|---|---|---|---|---|
| (MIRROR) | 37.58 | 78.71 | | |
| L1R1 | −161.75 | 2.50 | 1.92 | 18.90 |
| L1R2 | 73.72 | 4.92 | | |
| L2R1 | −47.73 | 4.00 | 1.54 | 55.98 |
| L2R2 | 25.47 | 14.39 | | |
| L3R1 | −153.61 | 6.41 | 1.80 | 39.64 |
| L3R2 | −41.03 | 2.00 | | |
| L4R1 | −71.64 | 3.24 | 1.54 | 55.98 |
| L4R2 | −34.89 | 12.09 | | |
| L5R1 | 26.78 | 1.30 | 1.88 | 40.81 |
| L6R1 | 9.78 | 4.52 | 1.67 | 33.05 |
| L6R2 | 151.86 | 2.18 | | |
| L7R1 | −15.43 | 1.30 | 1.83 | 42.71 |
| L8R1 | 16.13 | 3.66 | 1.70 | 30.05 |
| L8R2 | −14.82 | 6.70 | | |
| (APERTURE) | INF | 2.81 | | |
| L9R1 | 223.31 | 2.87 | 1.49 | 70.44 |
| L10R1 | −12.88 | 1.30 | 1.91 | 35.25 |
| L11R1 | 657.70 | 3.87 | 1.50 | 81.61 |
| L11R2 | −11.64 | 0.40 | | |
| L12R1 | 155.29 | 4.28 | 1.49 | 70.44 |
| L13R1 | −13.45 | 1.30 | 1.88 | 39.22 |
| L14R1 | 36.41 | 4.90 | 1.50 | 81.61 |
| L14R2 | −23.32 | 0.20 | | |
| L15R1 | 42.35 | 4.46 | 1.50 | 81.61 |
| L15R2 | −51.92 | 0.20 | | |
| L16R1 | 58.30 | 3.42 | 1.90 | 31.31 |
| L16R2 | −109.88 | 6.20 | | |

TABLE 8

| ASPH | MIRROR | L2R1 | L2R2 | L4R1 | L4R2 |
|---|---|---|---|---|---|
| Radius | 37.58 | −47.73 | 25.47 | −71.64 | −34.89 |
| Conic | −5.22 | 0.00 | 0.00 | 0.00 | 0.00 |
| 4TH | 5.96E−06 | 3.61E−06 | −9.93E−05 | 2.31E−06 | 1.82E−05 |
| 6TH | −3.66E−09 | 2.65E−07 | 5.83E−07 | −3.73E−08 | −7.18E−08 |
| 8TH | 1.80E−12 | −1.27E−09 | −2.47E−09 | 1.77E−09 | 1.91E−09 |
| 10th | −5.55E−16 | 3.00E−12 | 5.72E−12 | −1.05E−11 | −1.16E−11 |
| 12th | 9.83E−20 | −3.65E−15 | −6.93E−15 | 2.36E−14 | 2.76E−14 |
| 14th | −7.25E−24 | 1.84E−18 | 3.42E−18 | −1.87E−17 | −2.36E−17 |
| 16th | 0.00E+00 | 0.00E+00 | 0.00E+00 | 0.00E+00 | 0.00E+00 |

In fourth embodiment, the Abbe number Vd of the 11$^{th}$ lens of the rear group lens $G_2$ that is closest to the image source IMA side is 31.31 and the Nd is 1.90, it complies the requirement of the projection optical system 60D that the Abbe number Vd is between 16-35 and the Nd is between 1.8-2.05; the Fno (F-number) of the projection optical system 60D is 2.4, it complies the requirement of the projection optical system 60D that the Fno (F-number) is between 1.6-3.2; moreover, in this embodiment, the width W of the image 30 is 1994, the value of the projection distance T from the reflector 20 to the image 30 is 400, so the projection ratio T/W is 0.20, thus conforms to the conditional formula of the projection ratio of the projection optical system: 0.16<T/W<0.3; the displacement d of a center point of the image source corresponding to the optical axis is 4.08, the short side h of the image source is 5.83, so 2d/h is 140%, thus conforms the requirement of the projection optical system 60D that 130%<2d/h<160%; moreover, in this embodiment, the focal length F1 of the reflector 20 is set as 18.79, the focal length F2 of the lens group 10 is set as 7.73, so F1/F2 is 2.43, thus conforms the requirement of the projection optical system 60D that 2.2<F1/F2<3.0; the maximum image height of the projection optical system 60D is 8.709, the projection ratio is 0.20, the Fno is 2.4, the ratio of IMH/TR/Fno is 18.09, thus conforms to the conditional formula 8<IMH/TR/Fno<19; and the maximum image height of the projection optical system 60D is 8.709, the distance T1 from the reflector 20 to the lens group 10 is 78.71, and the total length T2 of the lens group is 99.22, so the ratio of IMH*T1/T2 is 6.91, which conforms to the conditional formula 5<IMH*T1/T2<8.

With the feature disclosed above, the projection optical systems 60A-60D of first to forth embodiments, the table 9 summarizes the focal length F1 of the reflector 20, the focal length F2 of the lens group 10, the maximum image height of the projection optical system, the throw ratio TR, the Fno of the projection optical system, the distance T1 from the reflector 20 to the lens group 10, the total length T2 of the lens group, the projection distance T, the width W of the image 30, the displacement amount d, and the short side h of the image source, and adjusts to a certain matching range, thereby promotes the effect of the stabilizing quality of the image 30. Furthermore, through the matching of each lens to meet the requirements of various optical conditions, the projection optical systems 60A-60D will achieve the best optical performance, including a) The ratio of F1/F2 is between 2.2-3.0 (F1 is the focal length of the reflector, F2 is the focal length of the lens group), which will optimize various aberrations and external size; b) The ratio of IMH/TR/Fno is between 8-19 (IMH is the largest image height, TR is the throw ratio, Fno is the F-number), it will optimize the resolution, tolerance sensitivity and cost performance; c) The ratio of IMH*T1/T2 is between 5-8 (IMH is the maximum image height, T1 is the distance from the reflector to the lens group, and T2 is the total length of the lens group), then the resolution and the optical path interference allowance will be optimized.

TABLE 9

| | Embodiment 1 | Embodiment 2 | Embodiment 3 | Embodiment 4 |
|---|---|---|---|---|
| F1 | 14.76 | 14.76 | 11.79 | 18.79 |
| F2 | 5.49 | 5.68 | 4.83 | 7.73 |
| Image height(IMH) | 4.355 | 4.355 | 4.413 | 8.709 |
| TR(T/W) | 0.25 | 0.27 | 0.19 | 0.20 |
| F-number (Fno) | 1.8 | 1.8 | 2.8 | 2.4 |
| T1 | 69.9 | 71.35 | 63.19 | 78.71 |
| T2 | 49.95 | 48.5 | 42.91 | 99.22 |
| T | 360 | 180 | 336 | 400 |
| W | 1439 | 664 | 1774 | 1994 |
| d | 2.04 | 2.04 | 2.11 | 4.08 |
| h | 2.92 | 2.92 | 2.92 | 5.83 |
| F1/F2 | 2.69 | 2.60 | 2.44 | 2.43 |
| IMH/TR/Fno | 9.67 | 8.93 | 8.32 | 18.09 |
| IMH*T1/T2 | 6.09 | 6.41 | 6.50 | 6.91 |
| 2 d/h | 140% | 140% | 145% | 140% |

With the features of the embodiments disclosed above, the present invention continues to develop and improve the numerical values such as focal length, maximum image height, projection ratio, F-number (Fno), the present invention are designed to have better optical effect compared with the lens patent of the prior art, the projection optical system of the present invention not only has differences, but also can take into account the image quality when the projection distance is shortened, so that the projection configuration can be adjusted to the optimum, so as to obtain a good optical effect.

Although particular embodiment of the invention has been described in detail for purposes of illustration, various modifications and enhancements may be made without departing from the spirit and scope of the invention. Accordingly, the invention is not to be limited except by the appended claims.

What is claimed is:

1. A projection optical system with a concave reflector in the projection lens, comprising:
   an image source positioned at an image source side of the projection optical system;
   a lens group arranged at the lateral side of the image source, said lens group having a focal length F2;
   a reflector positioned at said lateral side of the lens group;
   an image, the lens group and the reflector forming multiple optical paths between the image and the image source, wherein each optical path has a chief ray and a marginal ray; and an aperture arranged inside the lens group, a center of the aperture being defined as an origin, said aperture defining an axial direction as X axis and a radial direction as Y axis to form a rectangular coordinate system, wherein the rectangular coordinate system has a first quadrant, a second quadrant, a third quadrant and a fourth quadrant, and wherein the image source and the image are located in the same quadrant, and the projection optical system has an optical axis coinciding with the X axis, the chief ray of one of the optical paths forms a chief ray of a paraxial image height at a location where the image source is proximal to the optical axis, and wherein the chief ray of another one of the optical paths forms a marginal ray of an off-axis image height at a location where the image source is spaced apart from the optical axis; wherein said projection optical system complies below features:

a) $2.2 < F1/F2 < 3.0$, wherein F1 is the focal length of the reflector, and F2 is the focal length of the lens group;

b) $8 < IMH/TR/Fno < 19$, wherein IMH is the maximum image height, TR is the throw ratio, and Fno is the F-number (the ratio of the number of focal lengths to the number of apertures);

c) $5 < IMH*T1/T2 < 8$, wherein IMH is the maximum image height, T1 is the distance from the reflector to the lens group, and T2 is the total length of the lens group;

whereby when the image source and the image are located in the second quadrant and the reflector is located in the fourth quadrant, the chief ray of the paraxial image height intersects with the chief ray of the off-axis image height intersect, thus forming a first point and a second point, the first point being located at the origin and the second point being located in the first quadrant, and the chief ray of the optical path intersects with the marginal ray of the optical path, thus forming a third point and a fourth point, the third point being located at the fourth quadrant and the fourth point being located in the second quadrant.

2. The projection optical system with a concave reflector in the projection lens as claimed in claim 1, wherein the lens group can be divided into a front group lens and a rear group lens, the front group lens is close to the reflector side, and the rear group lens is close to the image source side.

3. The projection optical system with a concave reflector in the projection lens as claimed in claim 2, wherein the front group lens includes at least two aspheric lenses, and at least one of the aspheric lenses is a negative lens.

4. The projection optical system with a concave reflector in the projection lens as claimed in claim 2, wherein the rear group lens includes at least two doublets and a single lens, the first lens that close to the image side having Nd between 1.8-2.05 and Vd between 16-35.

5. The projection optical system with a concave reflector in the projection lens as claimed in claim 1, wherein the width of the image is set as W and the project distance from the reflector to the image is set as T, and conforms to the conditional formula of the projection ratio of the projection optical system: $0.16 < T/W < 0.3$.

6. The projection optical system with a concave reflector in the projection lens as claimed in claim 1, wherein a focal length value F of the projection optical system is 1.6-3.2.

7. The projection optical system with a concave reflector in the projection lens as claimed in claim 1, wherein a displacement of a center point of the image source corresponding to the optical axis is defined as d, and a short side of the image source is defined as h, and wherein $130\% < 2d/h < 160\%$.

* * * * *